United States Patent [19]

Cook

[11] Patent Number: 5,224,053
[45] Date of Patent: Jun. 29, 1993

[54] INTERACTIVE CONTROL FOR CAN END SYSTEMS

[75] Inventor: Steven T. Cook, Bellbrook, Ohio

[73] Assignee: Dayton Reliable Tool & Mfg. Co., Dayton, Ohio

[21] Appl. No.: 644,274

[22] Filed: Jan. 22, 1991

[51] Int. Cl.$^5$ .............................................. G06F 15/46
[52] U.S. Cl. .................................... 364/476; 364/188; 364/189; 364/472; 72/405; 340/825.16
[58] Field of Search ................ 364/146, 188, 189, 476, 364/474.22, 468, 472, 469; 72/405, 446; 413/66; 340/673, 674, 825.06, 825.16

[56] References Cited

U.S. PATENT DOCUMENTS

| | | | |
|---|---|---|---|
| Re. 33,061 | 9/1989 | Brown | 413/66 |
| 4,504,920 | 3/1985 | Mickowski | 364/550 |
| 4,568,230 | 2/1986 | Brown | 413/66 |
| 4,651,273 | 3/1987 | Braitinger | 364/188 |
| 4,750,131 | 6/1988 | Martinez | 364/476 |
| 4,939,665 | 7/1990 | Gold et al. | 364/476 |
| 5,119,311 | 6/1992 | Gold et al. | 364/476 |

*Primary Examiner*—Jerry Smith
*Assistant Examiner*—Paul Gordon
*Attorney, Agent, or Firm*—Joseph G. Nauman

[57] ABSTRACT

A control for a press and system for making can ends includes a programmable controller (PLC) which incorporates unique control software interconnecting the PLC and the press mechanisms. The PLC and its software in turn interfaces with a programmable interface device, such as a commercially available Smart Screen interface (SSI) which includes a keyboard and color monitor for operator input/output. The interface includes its own software which interfaces with the PLC software, the keyboard, the monitor, and a programmable CAD package which allows a designer to create and store various interactive and/or passive displays as unique software files related to conditions and operations of the can end making press system coupled to the PLC. A unique set of such programmed displays is disclosed, certain of which are directly interactive with parts and/or transducers fitted to the press and its related tooling. Some displays are continually interactive with the PLC control, others are interactive upon command, and still others are prompt and assist instruction types of display. These displays allow the system operator to operate the system through various set-up, jog, and run modes, maintenance functions, and also to indicate and identify incipient and actual error conditions, and to record data associated with the press operation. Records can be temporary or more permanent, as desired.

21 Claims, 43 Drawing Sheets

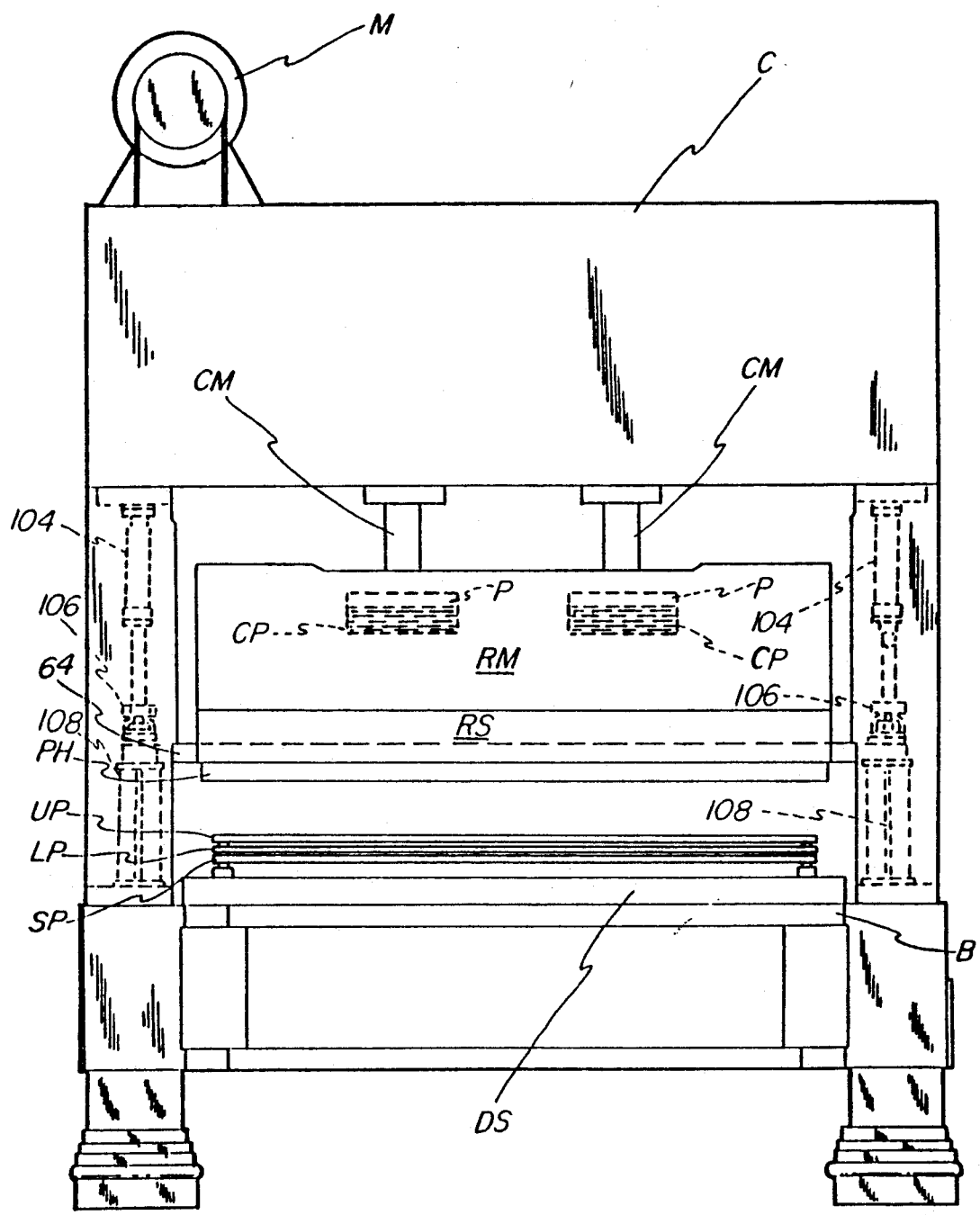

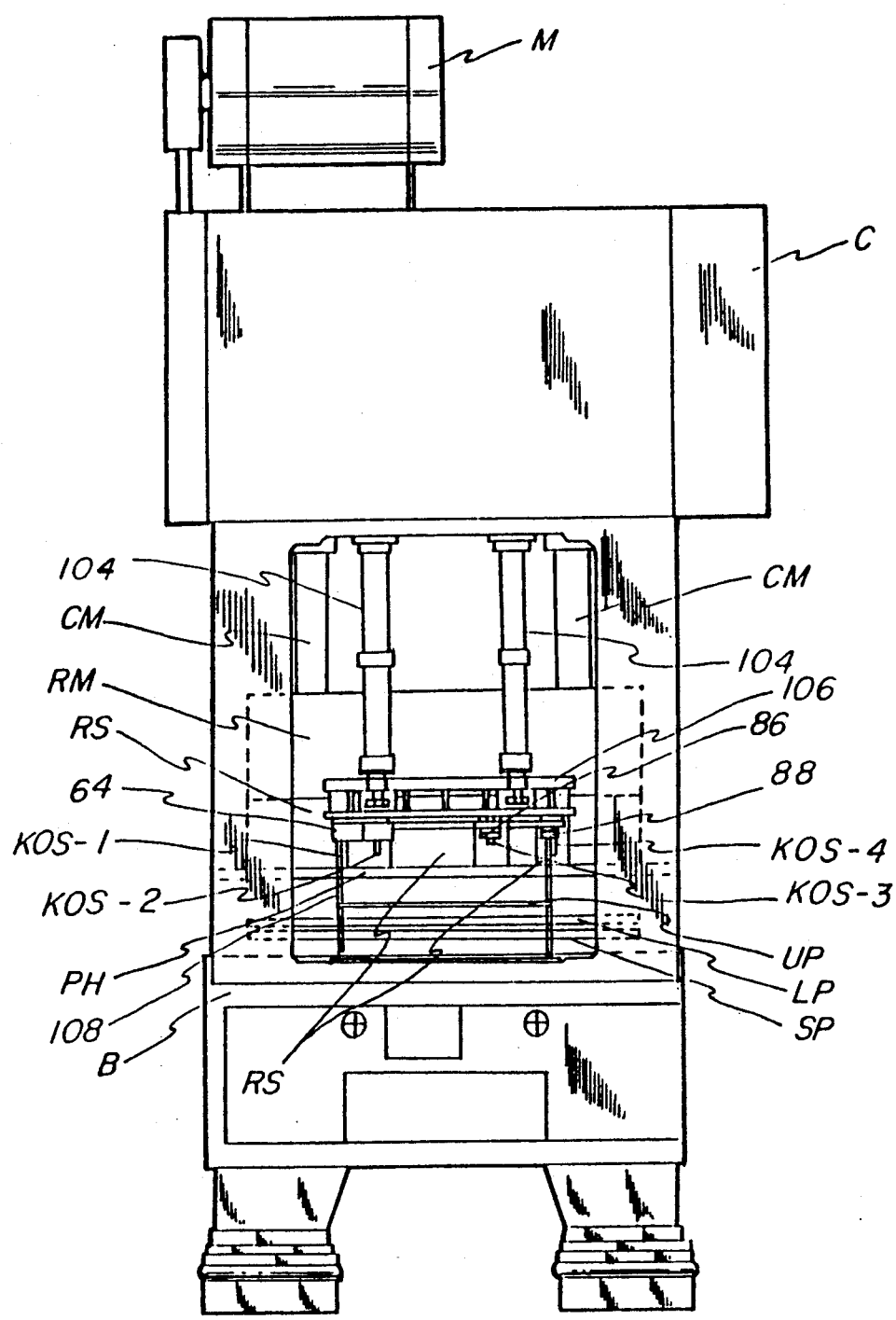

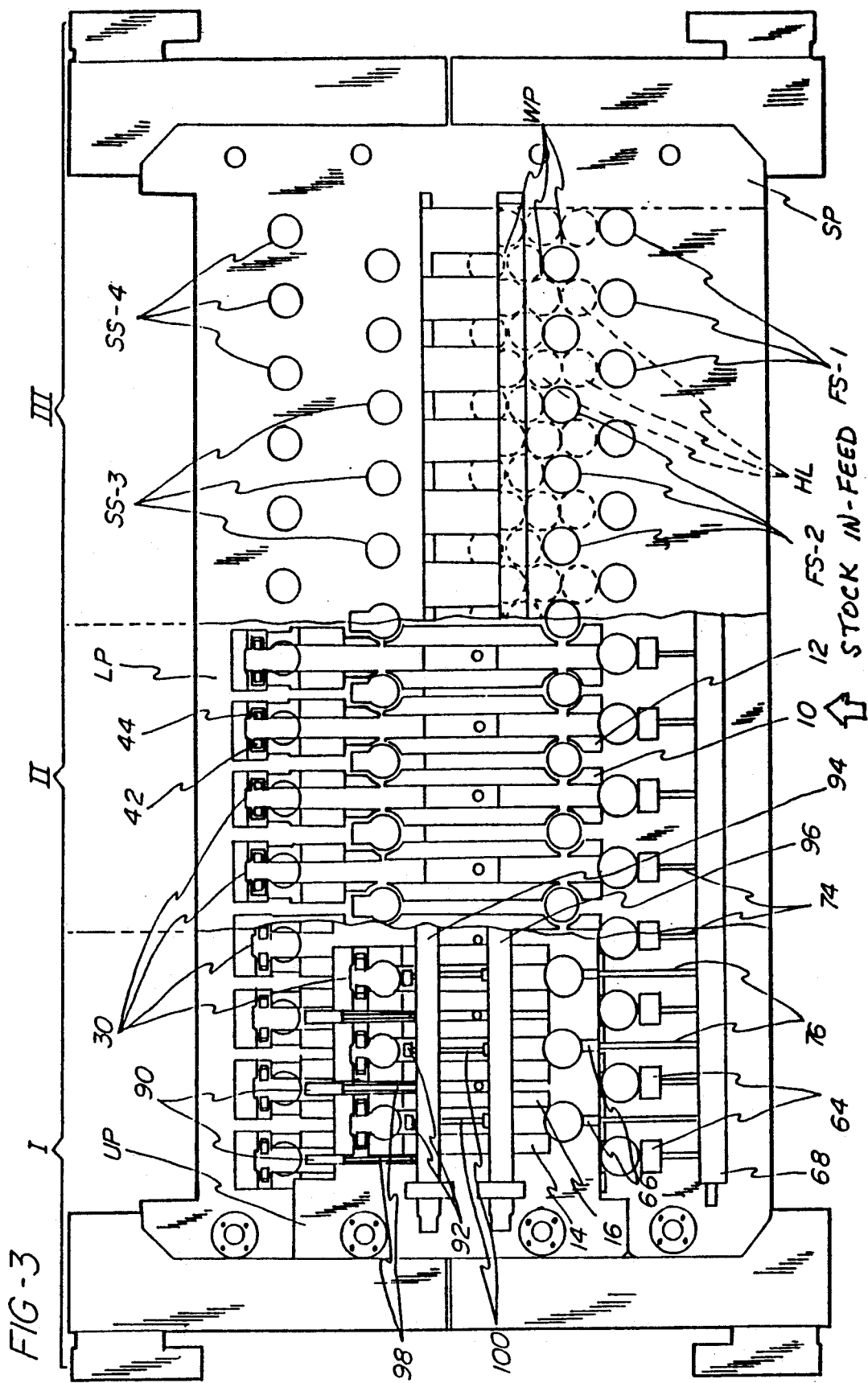

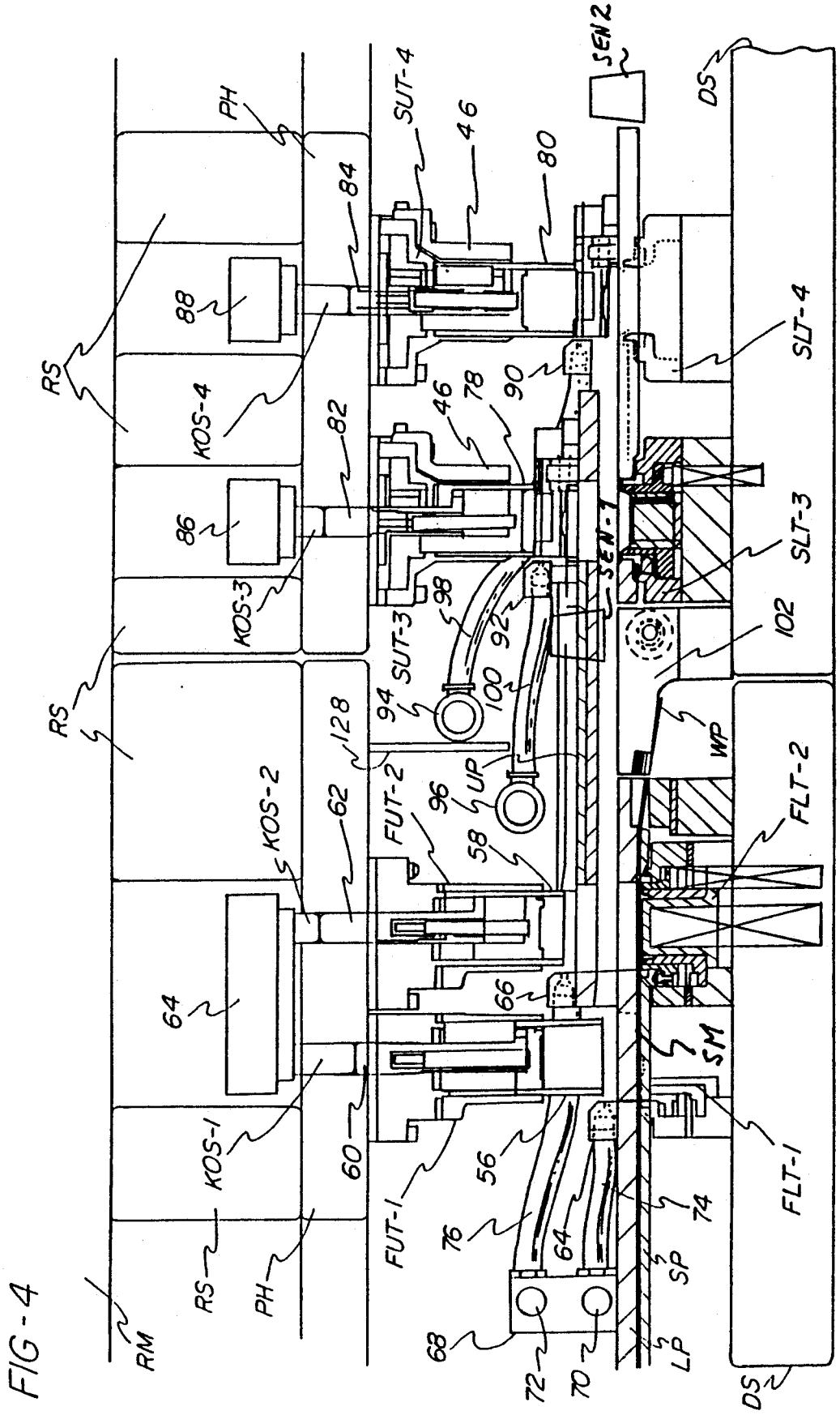

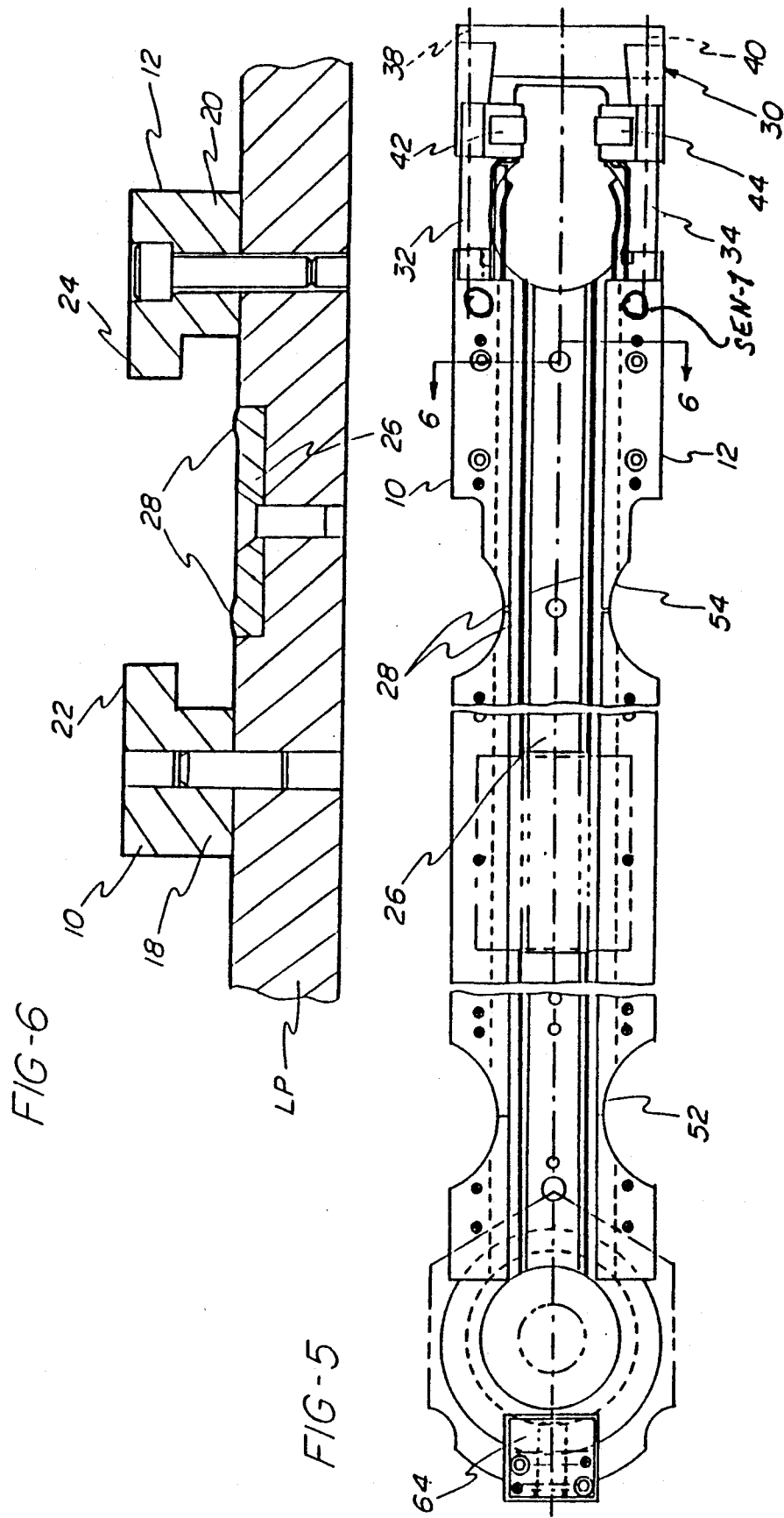

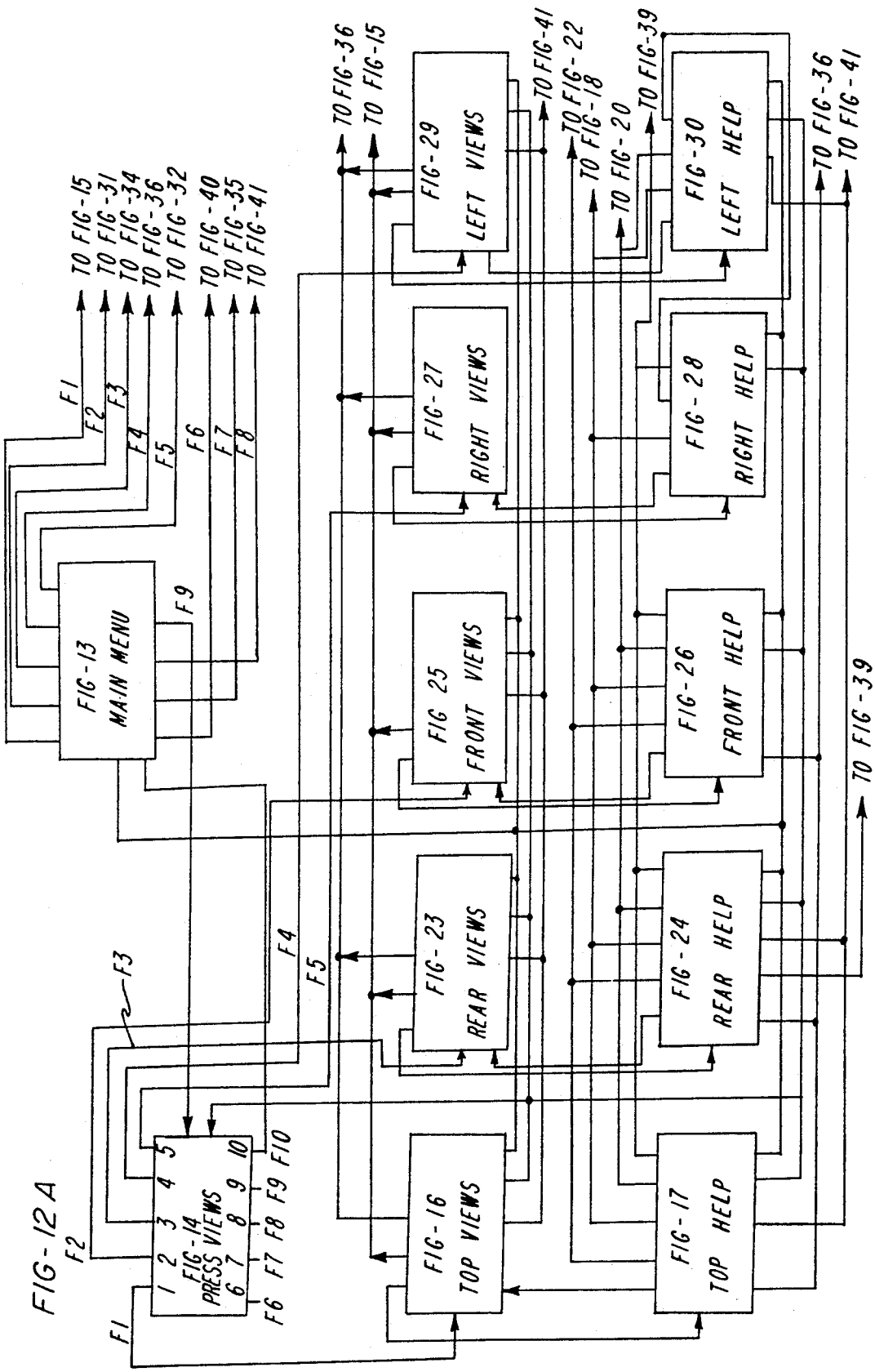

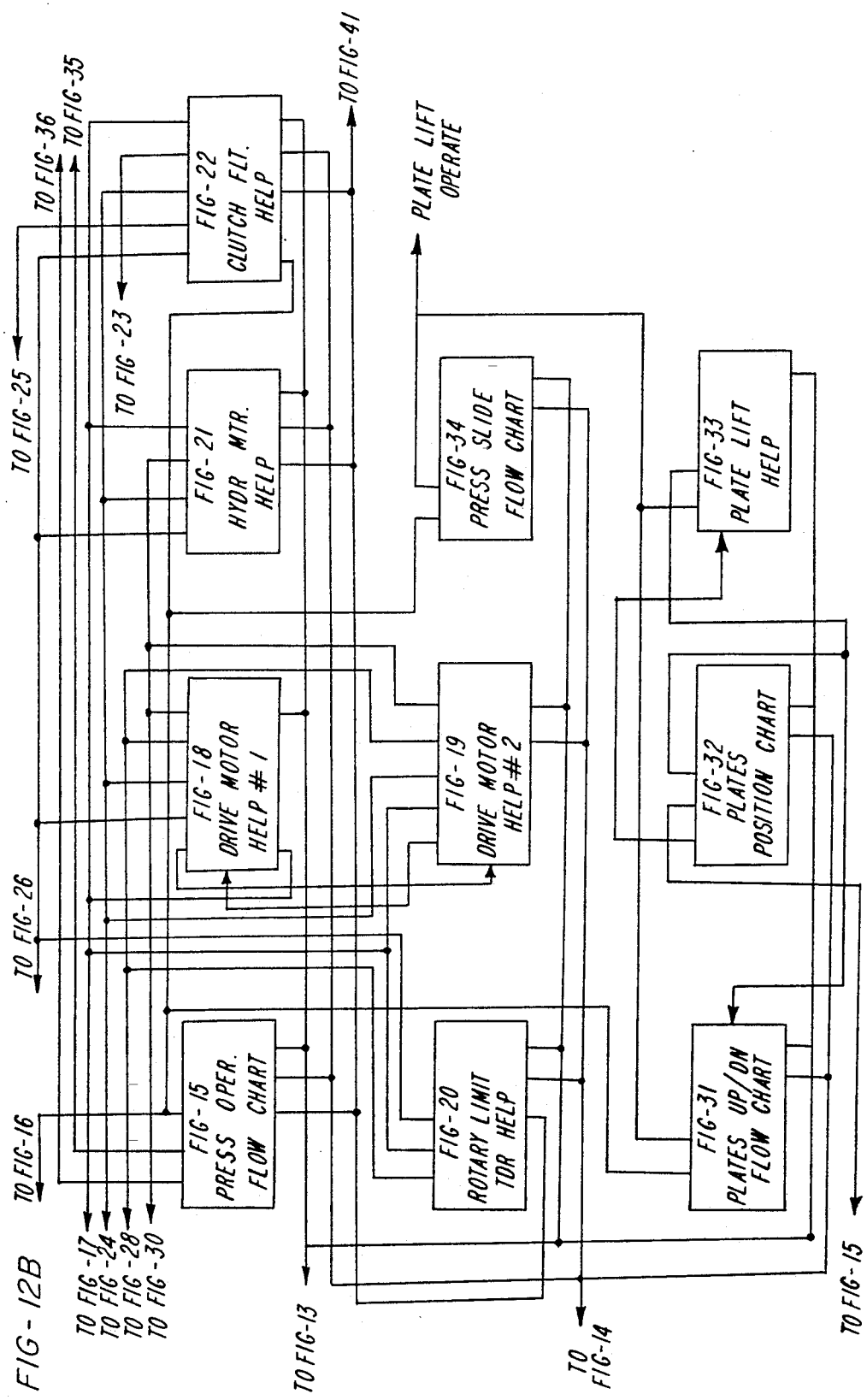

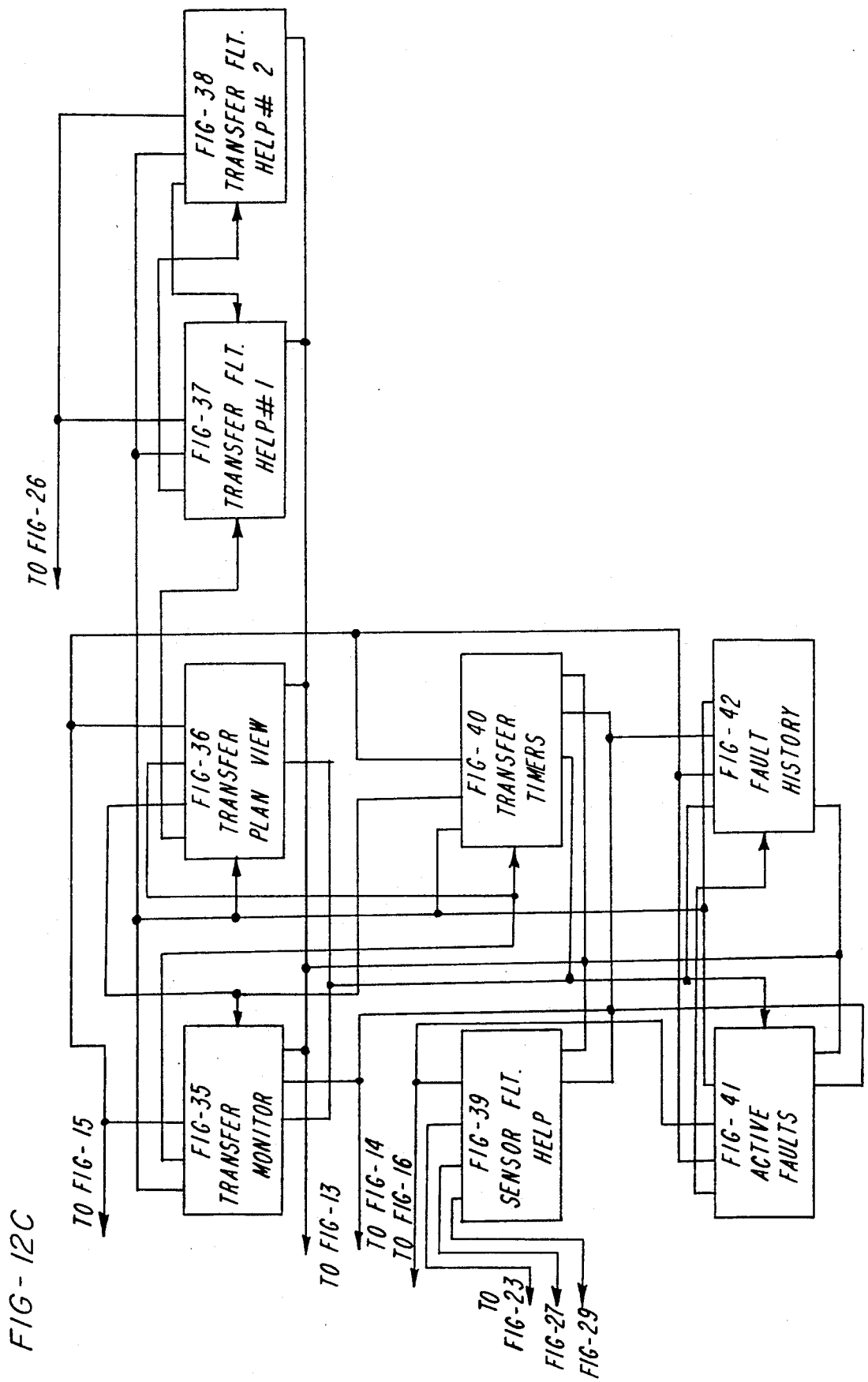

FIG. 13

DAYTON RELIABLE TOOL
HIGH SPEED WIDE SHELL PRESS
MAIN MENU

| F1 | PRESS OPERATION FLOW CHART |
|---|---|
| F2 | STRIPPER RAISE/LOWER FLOW CHART |
| F3 | SLIDE RAISE/LOWER FLOW CHART |
| F4 | SHELL TRANSFER PLAN VIEW |
| F5 | STRIPPER LIFT OPERATE |
| F6 | TRANSFER TIMERS |
| F7 | TRANSFER MONITOR |
| F8 | FAULT SCREEN |
| F9 | PRESS VIEW MENU |
| F10 | |

© Dayton Reliable Tool & Mfg. Co.
All Rights Reserved 1990

PRESS VIEWS

| F1 | PRESS TOP VIEW |
|---|---|
| F2 | PRESS FRONT VIEW |
| F3 | PRESS REAR VIEW |
| F4 | PRESS LEFT VIEW |
| F5 | PRESS RIGHT VIEW |
| F6 | |
| F7 | |
| F8 | |
| F9 | |
| F10 | RETURN TO MAIN MENU |

| TOP VIEW HELP SCREEN | | | |
|---|---|---|---|
| STRIPPER NOT DOWN | ALL PLATES ARE NOT DOWN! ALL PLATES MUST BE COMPLETELY DOWN TO CLEAR THE FAULT! | CLUTCH VALVE DEPRESS F2 | DEPRESS F1 TOP VIEW |
| SLIDE PSI LOW | | DRIVE MOTOR DEPRESS F3 | DEPRESS F2 CLUTCH HELP |
| HYDROSTATIC PSI LOW | | HYDRAULIC MTR DEPRESS F4 | DEPRESS F3 DRIVE HELP |
| CRANKSHAFT BRG PRESSURE LOW | | ROTARY LIMIT FLT DEPRESS F5 | DEPRESS F4 HYDR. HELP |
| DIRTY HYD. FILTER | | SHELL TRANSFER FLT VIEW DEPRESS F6 | DEPRESS F5 ROTARY HELP |
| HYD. PSI FAULT | | | DEPRESS F6 SHELL TRANS |
| OIL LEVEL LOW | | | DEPRESS F8 FAULT SCREEN |
| MAIN AIR PSI LOW | PLANT AIR PRESSURE IS LOW! AIR PRESSURE MUST BE ABOVE 80 PSI! | | DEPRESS F9 PRESS VIEW |
| ROLLFEED AIR PRESSURE LOW | | | DEPRESS F10 MAIN MENU |

FIG. 18

DRIVE MOTOR HELP SCREEN #1

| | |
|---|---|
| DRIVE MOTOR OVERLOAD 1MOL | DRIVE MOTOR OVERLOAD (1MOL) HAS BEEN TRIPPED. THIS IS A THERMAL MONITOR THAT MONITORS MOTOR LOAD (AMPERAGE). RESET AND RE-START DRIVE MOTOR. MONITOR MOTOR LOAD WITH EXTERNAL AMP METER TO VERIFY MOTOR IS NOT BEING OVERLOADED. IF AMPERAGE IS ABOVE NAME PLATE RATING, CORRECT PROBLEM OR REPLACE MOTOR BEFORE OPERATING THE PRESS. |
| DRIVE MOTOR AMMETER FLT | DRIVE MOTOR AMMETER HAS BEEN TRIPPED. THIS IS AN AMPERAGE MONITOR THAT MONITORS THE DRIVE MOTOR FOR EXCESSIVE CURRENT. THIS MONITOR IS ENABLED 10 SECONDS AFTER THE PRESS HAS BEEN PUT IN CONTINUOUS MODE. THE MOMENT THE CURRENT RISES ABOVE THE PRESET, NORMALLY SET 5-10 AMPS ABOVE NORMAL RUNNING CURRENT, THE PRESS WILL STOP AND THE DRIVE MOTOR WILL BE DE-ENERGIZED. THIS METER'S MAIN PURPOSE IS TO MONITOR THE PRESS. AN EXCESSIVE LOAD ON THE DRIVE MOTOR WILL CAUSE THIS METER TO TRIP, (IF THE METER IS SET PROPERLY). |
| DRIVE MOTOR CB1 TRIP CAB | DRIVE MOTOR CIRCUIT BREAKER (CB1) HAS BEEN TRIPPED. THIS IS A THERMAL THAT MONITORS THE DRIVE MOTOR FOR A SHORT CIRCUIT OR AN EXCESSIVE LOAD. IF THIS UNIT IS NOT SET PROPERLY, THE BREAKER COULD TRIP WHEN THE MOTOR IS FIRST STARTED. VERIFY THAT THE UNIT IS SET PROPERLY. IF IT IS, CHECK DRIVE MOTOR OR ITS WIRING FOR A POSSIBLE SHORT. |
| DRIVE MOTOR CB1 TRIP PRESS | DRIVE MOTOR CIRCUIT BREAKER ON THE PRESS HAS BEEN TRIPPED. THIS IS A THERMAL MONITOR THAT MONITORS THE DRIVE MOTOR FOR A SHORT CIRCUIT OR AN EXCESSIVE LOAD. IF THIS UNIT IS NOT SET PROPERLY, THE BREAKER COULD TRIP WHEN MOTOR IS FIRST STARTED. VERIFY THAT THE UNIT IS SET PROPERLY. IF IT IS, CHECK DRIVE MOTOR OR ITS WIRING FOR POSSIBLE SHORT CIRCUIT. THIS BREAKER IS ALSO USED AS A DISCONNECT FOR MAINTENANCE PURPOSES. |

| DEPRESS F1 SCREEN #2 | DEPRESS F2 FRONT HELP | DEPRESS F3 REAR HELP | DEPRESS F4 RIGHT HELP | DEPRESS F5 LEFT HELP | DEPRESS F6 TOP HELP | DEPRESS F10 MAIN MENU |
|---|---|---|---|---|---|---|

FIG. 19

DRIVE MOTOR HELP SCREEN #2

DRIVE START
OUTPUT FLT

DRIVE START OUTPUT Q2.7 HAS FAULTED. THE OUTPUT HAS EITHER SHORTED ON OR OFF. THIS IS AN EMERGENCY STOP AND MOTOR CANNOT BE RESTARTED UNTIL FAULT IS CORRECTED. REPLACE THE OUTPUT CARD.

| DEPRESS F1 | DEPRESS F2 | DEPRESS F3 | DEPRESS F4 | DEPRESS F5 | DEPRESS F9 | DEPRESS F10 |
|---|---|---|---|---|---|---|
| SCREEN #1 | FRONT HELP | REAR HELP | RIGHT HELP | LEFT HELP | PRESS VIEW | MAIN MENU |

FIG. 20

ROTARY LIMIT SWITCH HELP SCREEN

A ROTARY LIMIT SWITCH FAULT HAS OCCURRED. CHANNEL 1 IS MONITORED WITH A TIMER MONITORING FOR AN ON/OFF TRANSITION. CHANNEL 2 THRU CHANNEL 24 ARE MONITORED WITH AN UP/DOWN COUNTER AGAINST CHANNEL 1. CHANNEL 1 CAUSES THE COUNTER TO COUNT UP AND THE CHANNEL THAT IS BEING MONITORED CAUSES THE COUNTER TO COUNT DOWN. IF THE COUNTER COUNTS ABOVE THE PRESET, A FAULT OCCURS, THE PRESS IS STOPPED AND THE FAULTY CHANNEL OR CHANNELS ARE SHOWN.

| | |
|---|---|
| CHANNEL 1 STAYED ON FAULT | CHANNEL 13 FAULT |
| CHANNEL 1 STAYED OFF FAULT | CHANNEL 14 FAULT |
| CHANNEL 2 FAULT | CHANNEL 15 FAULT |
| CHANNEL 3 FAULT | CHANNEL 16 FAULT |
| CHANNEL 4 FAULT | CHANNEL 17 FAULT |
| CHANNEL 5 FAULT | CHANNEL 18 FAULT |
| CHANNEL 6 FAULT | CHANNEL 19 FAULT |
| CHANNEL 7 FAULT | CHANNEL 20 FAULT |
| CHANNEL 8 FAULT | CHANNEL 21 FAULT |
| CHANNEL 9 FAULT | CHANNEL 22 FAULT |
| CHANNEL 10 FAULT | CHANNEL 23 FAULT |
| CHANNEL 11 FAULT | CHANNEL 24 FAULT |
| CHANNEL 12 FAULT | |

| DEPRESS F1 | DEPRESS F2 | DEPRESS F3 | DEPRESS F8 | DEPRESS F9 | DEPRESS 10 |
|---|---|---|---|---|---|
| RIGHT HELP | TOP HELP | FRONT HELP | FAULT SCRN | PRESS VIEW | MAIN MENU |

FIG. 21

| | HYDRAULIC MOTOR HELP SCREEN |
|---|---|
| HYD. MOTOR OVERLOAD 2MOL | HYD. MOTOR OVERLOAD 2MOL HAS BEEN TRIPPED. THIS IS A THERMAL MONITOR THAT MONITORS MOTOR LOAD (AMPERAGE). RESET AND RESTART HYD. MOTOR. MONITOR MOTOR WITH EXTERNAL AMP METER TO VERIFY MOTOR IS NOT BEING OVERLOADED. IF AMPERAGE IS ABOVE NAME PLATE RATING CORRECT PROBLEM OR REPLACE MOTOR BEFORE OPERATING PRESS. |
| HYD. MOTOR CB2 TRIP CAB | HYD. MOTOR CIRCUIT BREAKER ON PRESS HAS BEEN TRIPPED. THIS IS A THERMAL MONITOR THAT MONITORS THE HYD MOTOR FOR A SHORT CIRCUIT OR AN EXCESSIVE LOAD. IF THIS UNIT IS NOT SET PROPERLY, THE BREAKER COULD TRIP WHEN THE MOTOR IS FIRST STARTED. VERIFY THAT THE UNIT IS SET PROPERLY. IF IT IS, CHECK HYD MOTOR OR ITS WIRING FOR POSSIBLE SHORT CIRCUIT. |
| HYD. MOTOR CB TRIP PRESS | HYD. MOTOR CIRCUIT BREAKER ON PRESS HAS BEEN TRIPPED. THIS A THERMAL MONITOR THAT MONITORS THE HYD MOTOR FOR A SHORT CIRCUIT OR AN EXCESSIVE LOAD. IF THIS UNIT IS NOT SET PROPERLY, THE BREAKER COULD TRIP WHEN THE MOTOR IS FIRST STARTED. VERIFY THAT THE UNIT IS SET PROPERLY. IF IT IS, CHECK HYD MOTOR OR ITS WIRING FOR A POSSIBLE SHORT CIRCUIT. THIS BREAKER IS ALSO USED AS A DISCONNECT FOR MAINTENANCE PURPOSES. |

| DEPRESS F1 FRONT HELP | DEPRESS F2 REAR HELP | DEPRESS F3 LEFT HELP | DEPRESS F4 TOP HELP | DEPRESS F8 FAULT SCREEN | DEPRESS F9 PRESS VIEW | DEPRESS F10 MAIN MENU |

FIG. 22

CLUTCH FAULT HELP SCREEN

| | |
|---|---|
| CLUTCH VALVE 'A' FAULT | CLUTCH VALVE 'A' SW MONITOR INPUT 114.2 FAILED TO OPERATE. REPLACE VALVE NOW! CLUTCH VALVE MALFUNCTION IS POSSIBLE! |
| CLUTCH VALVE 'B' FAULT | CLUTCH VALVE 'B' SW MONITOR INPUT 114.3 FAILED TO OPERATE. REPLACE VALVE NOW! CLUTCH VALVE MALFUNCTION IS POSSIBLE! |
| CLUTCH VALVE 'A' OUTPUT FAULT | VALVE 'A' OUTPUT Q0.3 FAILED TO OPERATE PROPERLY. THERE COULD BE A SHORT ON THE OUTPUT. OUTPUT CARD MAY BE FAULTY. |
| CLUTCH VALUE 'B' OUTPUT FAULT | VALVE 'B' OUTPUT Q0.4 FAILED TO OPERATE PROPERLY. THERE COULD BE A SHORT ON THE OUTPUT. OUTPUT CARD MAY BE FAULTY. |
| CLUTCH CONTROL OUTPUT FAULT | CLUTCH CONTROL OUTPUT Q0.1 FAILED TO OPERATE PROPERLY. THERE COULD BE A SHORT ON THE OUTPUT. OUTPUT CARD MAY BE FAULTY. |
| SOLID STATE RELAY SSR2 CLUTCH A FLT | SOLID STATE RELAY CONTROLLING CLUTCH VALVE 'A' FAILED TO OPERATE PROPERLY. RELAY COULD HAVE A SHORT. REPLACE NOW! |
| SOLID STATE RELAY SSR3 CLUTCH B FLT | SOLID STATE RELAY CONTROLLING CLUTCH VALVE 'B' FAILED TO OPERATE PROPERLY. RELAY COULD HAVE A SHORT. REPLACE NOW! |
| SOLID STATE RELAY SSR1 CLUTCH DUMP | SOLID STATE RELAY CONTROLLING CLUTCH DUMP VALVE FAILED TO OPERATE PROPERLY. RELAY COULD HAVE A SHORT. REPLACE NOW! |

| DEPRESS F1 FRONT HELP | DEPRESS F2 FRONT VIEW | DEPRESS F3 REAR HELP | DEPRESS F4 REAR VIEW | DEPRESS F5 TOP HELP | DEPRESS F4 TOP VIEW | DEPRESS F9 PRESS VIEW | DEPRESS F9 MAIN MENU | DEPRESS F10 FAULT SCREEN |

FIG. 24

REAR VIEW HELP SCREEN

| | | |
|---|---|---|
| STRIPPER NOT DOWN | ALL PLATES ARE NOT DOWN! ALL PLATES MUST BE COMPLETELY DOWN TO CLEAR THE FAULT! | CLUTCH VALVE DEPRESS F2 |
| SLIDE PSI LOW | | DRIVE MOTOR DEPRESS F3 |
| HYDROSTATIC PSI LOW | | HYDRAULIC MTR DEPRESS F4 |
| CRANKSHAFT BRG PSI LOW | | ROTARY LIMIT FLT DEPRESS F5 |
| DIRTY HYD. FILTER | | SHELL TRANSFER FLT VIEW DEPRESS F6 |
| HYD. PSI FAULT | | 2nd STATION SENSOR FAULT DEPRESS F7 |
| OIL LEVEL LOW | | |
| MAIN AIR PSI LOW | PLANT MAIN AIR PRESSURE IS LOW! AIR PRESSURE MUST BE ABOVE 80 PSI! | |

| |
|---|
| DEPRESS F1 LEFT VIEW |
| DEPRESS F2 CLUTCH HELP |
| DEPRESS F3 DRIVE HELP |
| DEPRESS F4 HYDR. HELP |
| DEPRESS F5 ROTARY HELP |
| DEPRESS F6 SHELL TRANS |
| DEPRESS F7 SENSOR FLT HELP |
| DEPRESS F8 FAULT SCREEN |
| DEPRESS F9 PRESS VIEW |
| DEPRESS F10 MAIN MENU |

FIG. 26

FRONT VIEW HELP SCREEN

| | | |
|---|---|---|
| STRIPPER NOT DOWN | ALL PLATES ARE NOT DOWN! ALL PLATES MUST BE COMPLETELY DOWN TO CLEAR THE FAULT! | CLUTCH VALVE DEPRESS F2 |
| SLIDE PSI LOW | | DRIVE MOTOR DEPRESS F3 |
| HYDROSTATIC PSI LOW | | HYDRAULIC MTR DEPRESS F4 |
| CRANKSHAFT BRG PSI LOW | | ROTARY LIMIT FLT DEPRESS F5 |
| DIRTY HYD FILTER | | SHELL TRANSFER FLT VIEW DEPRESS F6 |
| HYD PSI FAULT | | 2nd STATION SENSOR FAULT DEPRESS F7 |
| OIL LEVEL LOW | | |
| MAIN AIR PSI LOW | PLANT MAIN AIR PRESSURE IS LOW! AIR PRESSURE MUST BE ABOVE 80 PSI! | |
| ROLLFEED AIR PRESSURE LOW | | |

DEPRESS F1 FRONT VIEW
DEPRESS F2 CLUTCH HELP
DEPRESS F3 DRIVE HELP
DEPRESS F4 HYDR. HELP
DEPRESS F5 ROTARY HELP
DEPRESS F6 SHELL TRANSFER HELP
DEPRESS F9 PRESS VIEW
DEPRESS F10 MAIN MENU

FIG. 33

STRIPPER LIFT HELP SCREEN

WHEN RAISING ANY OF THE PLATES IT IS IMPORTANT THAT ALL OF THE REQUIRED SCREWS BE REMOVED. THE SCREWS THAT ARE TO BE REMOVED ARE HIGHLIGHTED RED. THE CYLINDERS THAT ARE TO BE OPERATED ARE HIGHLIGHTED GREEN.

TOP PLATE-10 SCREWS ARE TO BE REMOVED AND PLACED IN THE HOLDER LABELED TOP PLATE BEFORE PLATE CAN BE RAISED.

BOTTOM PLATE-12 SCREWS ARE TO BE REMOVED AND PLACED IN THE HOLDER LABELED BOTTOM PLATE BEFORE PLATE CAN BE RAISED.

STOCK PLATE-12 SCREWS ARE TO BE REMOVED. 8 SCREWS ARE TO BE PLACED IN THE HOLDER LABELED STOCK PLATE. 4 SCREWS ARE TO BE PLACED IN ANOTHER LOCATION WHICH WILL BOLT THE BOTTOM PLATE AND THE STOCK PLATE TOGETHER. THE 4 LOCATIONS ARE SHOWN WITH RED ARROWS.

BEFORE ANY OF THE PLATES CAN BE RAISED THE SLIDE MUST BE BETWEEN 350 deg (angle) AND 010 deg (angle). THE SLIDE MUST ALSO BE IN THE SLIDE UP POSITION (quick lift up).

| DEPRESS F1 | DEPRESS F2 | DEPRESS F10 |
|---|---|---|
| STRIP LIFT | STRIPPER LIFT FLOW CHART | MAIN MENU |

FIG. 37

```
SHELL TRANSFER FAULT HELP SCREEN #1

A RED LIGHT INDICATES A TRANSFER FAULT HAS OCCURRED IN THAT LANE.

IF A TRANSFER FAULT IS ISOLATED TO ONE LANE THE PROBLEM MAY BE
IN THE SHELL CATCH FINGER AREA. CHECK FOR WEAK OR BROKEN SPRINGS,
WAX OR DIRT IN THE CATCH AREA. THE QUICKEST APPROACH WOULD BE
CHANGING THE FINGER ASSEMBLY WITH ANOTHER SET TO REMOVE THE
POSSIBILITY OF FAILURE IN THAT LANE.

THE AIR DRIVERS ARE SUPPLIED WITH AIR THRU SOLENOID VALVES
SUPPLYING MULTIPLE LANES.

IF THERE ARE SEVERAL TRANSFER FAULTS IN LANES SUPPLIED BY A
COMMON SOLENOID VALVE, THE VALVE MAY BE FAULTY.

SOLENOID VALVES (22,23) SUPPLY 1st STATION UPPER LANES 2-26
SOLENOID VALVES (24,25) SUPPLY 1st STATION LOWER LANES 1-27
SOLENOID VALVES (26,27) SUPPLY 2nd STATION UPPER LANES 2-26
SOLENOID VALVES (28,29) SUPPLY 2nd STATION LOWER LANES 1-27

DEPRESS F1 FOR NEXT HELP SCREEN WHICH SUPPLIES INFORMATION
ON VACUUM SUPPLY
```

| DEPRESS F1 | DEPRESS F2 | DEPRESS F3 | DEPRESS F10 |
|---|---|---|---|
| MORE HELP | SHELL TRANS | FRONT HELP | MAIN MENU |

FIG. 38

SHELL TRANSFER HELP SCREEN #2

THE TOOLS ARE SUPPLIED WITH VACUUM, THRU SOLENOID VALVES AND AN AIR OPERATED VACUUM PUMP (VENTURI), WHICH HOLDS THE SHELL IN PLACE FOR EJECTION BY THE AIR DRIVER. THESE SOLENOID VALVES AND PUMPS SUPPLY MULTIPLE LANES.

SOLENOID VALVE (36) VAC PUMP (C1U1) SUPPLIES 1st STATION LANES 14-26
SOLENOID VALVE (37) VAC PUMP (C1L1) SUPPLIES 1st STATION LANES 15-27
SOLENOID VALVE (38,41) VAC PUMP(C2U2) SUPPLIES 2nd STATION LANES 16-26
SOLENOID VALVE (39,42) VAC PUMP (C2L2) SUPPLIES 2nd STATION LANES 15-27
SOLENOID VALVE (4) VAC PUMP (C3U1) SUPPLIES 1st STATION LANES 2-12
SOLENOID VALVE (5) VAC PUMP (C3L1) SUPPLIES 1st STATION LANES 1-13
SOLENOID VALVE (6,43) VAC PUMP (C4U2) SUPPLIES 2nd STATION LANES 2-14
SOLENOID VALVE (7,44) VAC PUMP (C4L2) SUPPLIES 2nd STATION LANES 1-13

IF THERE ARE SEVERAL TRANSFER FAULTS IN LANES SUPPLIED BY A COMMON SOLENOID VALVE OR PUMP, THE PUMP OR VALVE COULD BE FAULTY.

A DIRTY EXHAUST FILTER ON A VACUUM PUMP COULD CAUSE A LOW VACUUM. THIS COULD CAUSE A TRANSFER FAULT BY ALLOWING THE SHELL TO FALL OFF OF THE UPPER TOOLING.

DEPRESSING F1 WILL RETURN YOU BACK TO SHELL TRANSFER FAULT HELP SCREEN #1, WHICH SUPPLIES INFORMATION ON AIR SUPPLY.

| DEPRESS F1 SCREEN #1 | DEPRESS F2 SHELL TRANS | DEPRESS F3 FRONT HELP | DEPRESS F10 MAIN MENU |

FIG. 39

SENSOR FAULT HELP SCREEN

A 1st OR 2nd STATION SENSOR IS ABOUT TO CAUSE A FALSE TRANSFER FAULT ALARM. THE SENSOR MAY BE OUT OF ADJUSTMENT OR DIRTY. BEFORE READJUSTING THE SENSOR, TRY CLEANING THE LENS BY WIPING IT WITH A CLEAN CLOTH.

IF YOU ARE NOT SURE WHICH SENSOR.IT IS REFER BACK TO ONE OF THE FOLLOWING SCREENS.

1st STATION SENSORS LANES 1-13 - LEFT VIEW DEPRESS F1
1st STATION SENSORS LANES 14-27 - RIGHT VIEW DEPRESS F2
2nd STATION SENSORS LANES 1-27 - REAR VIEW DEPRESS F3

| DEPRESS F1 | DEPRESS F2 | DEPRESS F3 | DEPRESS F4 | DEPRESS F9 | DEPRESS F10 |
|---|---|---|---|---|---|
| LEFT VIEW | RIGHT VIEW | REAR VIEW | TOP VIEW | PRESS VIEW | MAIN MENU |

FIG. 40

| LANE 1 ☐ | LANE 7 ☐ | LANE 13 ☐ | LANE 19 ☐ | LANE 25 ☐ |
| --- | --- | --- | --- | --- |
| LANE 2 ☐ | LANE 8 ☐ | LANE 14 ☐ | LANE 20 ☐ | LANE 26 ☐ |
| LANE 3 ☐ | LANE 9 ☐ | LANE 15 ☐ | LANE 21 ☐ | LANE 27 |
| LANE 4 ☐ | LANE 10 ☐ | LANE 16 ☐ | LANE 22 ☐ | |
| LANE 5 ☐ | LANE 11 ☐ | LANE 17 ☐ | LANE 23 ☐ | |
| LANE 6 ☐ | LANE 12 ☐ | LANE 18 ☐ | LANE 24 ☐ | |

| DEPRESS F1 SHELL TRANSFER | DEPRESS F2 TRANSFER MONITOR | DEPRESS F3 PRESS OPERATION FLOW CHART | DEPRESS F8 FAULT SCREEN | DEPRESS F9 PRESS VIEW | DEPRESS F10 MAIN MENU |

INTERACTIVE CONTROL FOR CAN END SYSTEMS

BACKGROUND OF THE INVENTION

This invention relates to a system including a press and special tooling fitted to the press for forming can ends, particularly of the self-opening type. Typical such systems are disclosed in U.S. Pat. Nos. 4,599,884 and 4,637,961 which relate to making shells for can ends, and No. Re. 33,061 which relates to converting shells to can ends. Such presses and systems have been fitted with programmable controllers (PLCs) in the past, however operator interface has been minimal, generally in the form of lamps, gages, or a few messages on a small bill-board style display. The systems are complicated, use tooling of high precision, and operate at relatively high speed. There is a need for better monitoring of system operation to avoid damage to the tooling or the press if there is a fault which is not quickly detected. There is also a need to maintain a better history of press operation, to allow study of causes for down time, and to assist in analysis of subsystems performance and further develop maintenance procedures and schedules.

By way of one specific example, shell systems are now provided which include up to twenty-seven lanes of shell making tooling and operate at speeds in the order of 350 press revolutions per minute, for as much as twenty two hours/day. Any misfeed of parts can result in a jam within the tooling that in turn can severely damage the tooling, and the resultant down time of the system can represent great amounts of production loss. There is a need not only to detect and react quickly to malfunctions, but also to capture and observe information and data which may assist in predicting potential malfunctions within these systems. Even if there is not a damaging jam, various detectors are arranged to stop the press in anticipation of a malfunction, or in response to a malfunction of a peripheral device (e.g. a stock feeding or a product discharge apparatus). Frequent stops can lead to excessive wear in the main clutch of the press.

As mentioned previously, PLCs have been used to control such press machinery, but each type of installation requires a unique program for the PLC to couple it to the press and its various control and detection devices, e.g. the main clutch, the hydraulic motor, and detectors in both the moving press parts and in the special tooling fitted to the press. This programming functions as the control circuitry for running the press through it several regimens.

Various forms of interface and monitoring systems, which may interface with PLCs for controlling complicated manufacturing machinery, are per se known. These systems include CRT monitors, lights and gage displays, and keyboards or other input/output consoles for use by an operator in starting, stopping, and controlling such machinery. However, none have heretofore been applied to can end systems.

SUMMARY OF THE INVENTION

A system for forming can ends, particularly of the self-opening type, includes a press and special tooling fitted to the press, and a control for monitoring operation of the system and for providing graphic feedback control information. Such information will indicate the type and/or location of actual or potential fault or malfunction conditions, will assist the operating in locating and correcting the fault(s), will keep records of such faults or malfunctions for analysis (such as tell-tale repetitions), and will also assist the operating personnel in various maintenance and repair operations, and may also provide production data.

The press is fitted with a position transducer which outputs signals correlated to the cyclic movement of the press and the corresponding opening and closing of the tooling. These signals provide an ongoing identification of press motion which refreshes after each cycle, e.g. from press crank top dead center (0°) through one rotation (360°).

The overall control of the press and system is provided by a programmable controller (PLC) which may be any of several commercially available types. The PLC incorporates unique corresponding control software, custom prepared by the systems engineer for the press system, to interconnect the PLC and the press mechanisms. The PLC and its software in turn interfaces with a programmable interface device. In the present invention such a device is a Smart Screen interface (SSI) which includes a keyboard and color monitor for operator input/output. The Smart Screen unit is supplied from Total Controls Products, Inc. of Berkeley Ill. It includes its own software which interfaces with the PLC software, the keyboard, and the monitor, as well as a programmable CAD package which allows the system designer to create and store various interactive and/or passive displays. Such displays are not part of the SSI software, but are created as unique software files related to conditions and operations of the machine coupled to the PLC, in this instance the can end making system.

The invention provides a unique set of programmed displays, certain of which are directly interactive with parts and/or transducers fitted to the press and its related tooling. Some of these displays are continually interactive with the PLC control, while others are interactive upon command, and still others are prompt and assist instruction types of display. The unique displays allow the system operator to operate the system through various set-up, jog, and run modes, maintenance functions, and also to indicate and identify incipient and actual error conditions, and to record data associated with the press operation. Records can be temporary or more permanent, as desired.

Thus, the primary object of the invention is to provide a unique can end manufacturing system which incorporates novel controls to allow expanded operator assistance to press operating personnel; to provide such controls which detect incipient and actual faults and/or malfunctions of various parts of the end making system and display indications of same to the operating personnel; to provide such controls which also aid the personnel in identifying and correcting malfunction or fault conditions; and to provide controls which make available records of press operation and of fault or malfunction type and occurrence.

Other objects and advantages of the invention will be apparent from the following description, the accompanying drawings and the appended claims.

DESCRIPTION OF THE DRAWINGS

FIGS. 1 and 2 are, respectively, front and side views of a typical reciprocating press to which the present invention applies, used to produce shells for can ends;

FIG. 3 is a plan view of shell transfer apparatus in which area I shows a transfer apparatus with both the upper and lower transfer plates in place, area II shows the transfer apparatus with the upper transfer plate removed and with the positions of the lower level guide rails shown, and area III shows the transfer apparatus with both the upper and lower transfer plates removed and with the path of the scrap skeleton shown;

FIG. 4 is an elevational view with the ram of the press in an uppermost operational position;

FIG. 5 is a plan view of one transfer path along the lower transfer plate;

FIG. 6 is a sectional view taken generally along line 6—6 of FIG. 5;

FIGS. 12-A, 12-B and 12-C comprise together a flow diagram of the interelation on the various screen (active and passive) of the control system; and FIGS. 13-42 are reproductions of actual display screens which are generated on the display monitor by the control system.

DESCRIPTION OF THE PREFERRED EMBODIMENT

Press and Tooling

Figure 7:
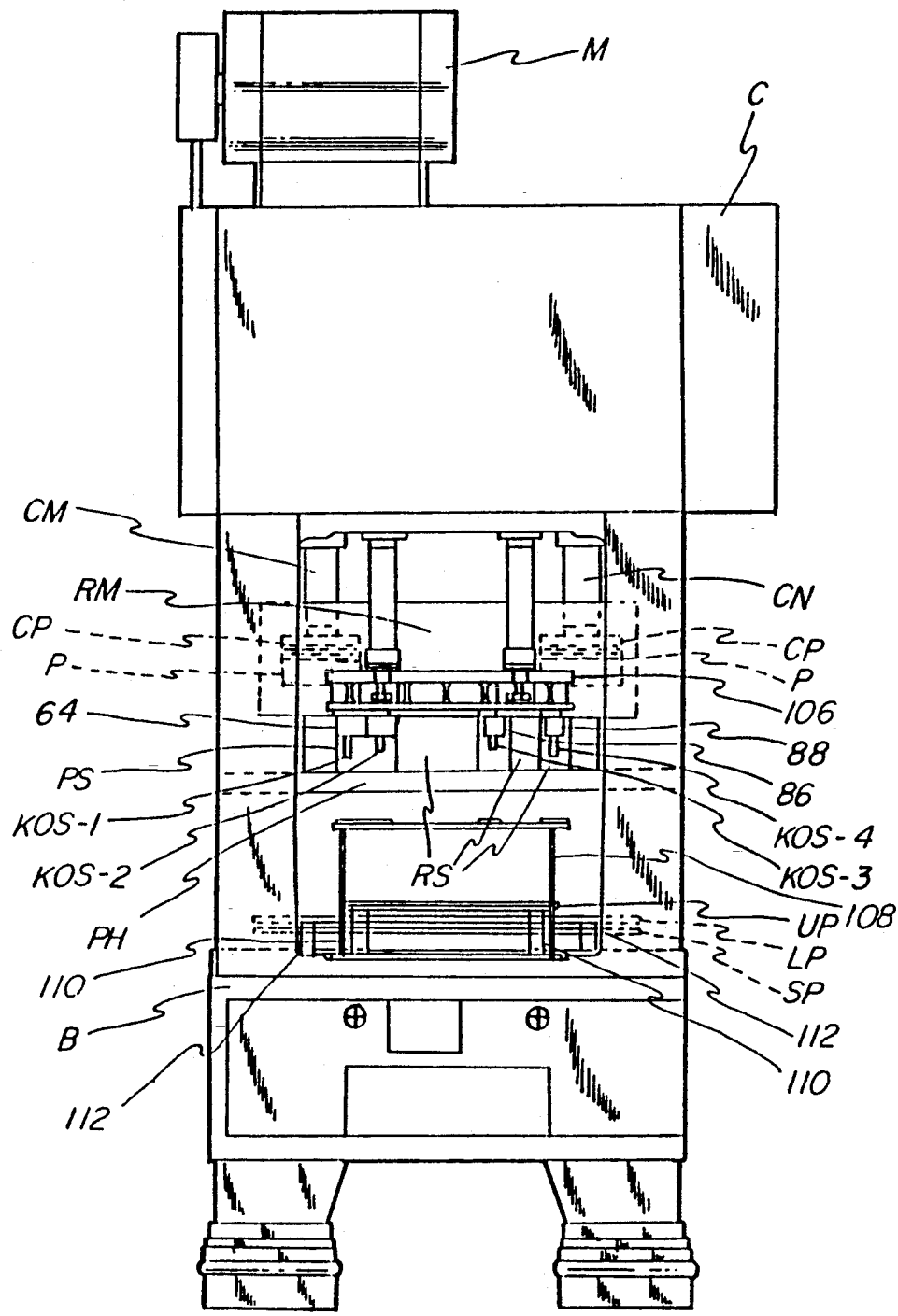
FIG. 7 is a side view similar to FIG. 2 in which the ram and knock-out bars are moved to their uppermost positions to provide access to the transfer plates.

The present invention is applicable to various forms of reciprocating forming presses used in the manufacture of can ends and parts therefor. The drawings and following description disclose an embodiment in which the press and tooling are used to produce shells for can ends, in a two step process, as generally described in U.S. Pat. No. 4,637,961. It will be clear, however, that the invention is also applicable to other press and tooling equipment for producing can ends.

Referring to the drawings, a typical press used in the manufacturing of shells for can ends might be a Minster SAS4-H125-90 press, the outline and lay-out of which is shown in FIGS. 1 and 2. The press includes a drive motor M mounted on the top of the crown C of the press for rotating a crankshaft CR connected to reciprocate a slide (also called a ram) RM along an upstroke and a downstroke, through a set of four cylinder members CM extending down from the crown C. The ram is guided in its reciprocating motion by the side guides (not shown) which are part of the press structure, and additional guiding is provided by conventional ball bearing and bushing guides (not shown) at each of the four corners of the ram. A punch holder PH is supported from the lower surface of the ram for supporting the upper tooling of a tooling set provided for the formation of shells. The punch holder is spaced from the lower surface of the ram by a set of spaced risers RS which extend across the width of the ram.

The press further includes a bed B which supports a die shoe DS for mounting the lower tooling of the tooling set for forming the shells. The die shoe DS supports an upper transfer plate UP, a lower transfer plate LP and a stock support plate SP which are provided for purposes to be described below. Thin metal stock material SM (FIG. 4) is fed incrementally into the press at a stock feed level between the stock support plate SP and the lower transfer plate LP until the material SM is aligned with a set of first stations where a substantially circular blank is punched out of material SM and formed into a shell preform by cooperating upper and lower die sets. Stock material SM is fed by a set of feed rollers (not shown) such that the stock material SM enters the press in incremental movements synchronized with the movement of the press ram RM. Feed mechanisms for this purpose are per se old and well known in the art and may feed stock material from a roll or, alternatively, feed individual sheets of stock material from a stack thereof.

The shell preform is then transferred by a conveyor means to a point where it is aligned with a second station. There, a second set of cooperating upper and lower tooling forms the shell preform into a completed shell, which is then transferred by conveyor means from the press. In addition, after the material SM leaves the first station tooling, the remaining scrap material is transferred out of the press at a point intermediate the first and second tooling stations.

As seen in FIG. 3, the tooling is arranged in four parallel rows including first and second rows FS-1 and FS-2, respectively, at the first station, and third and fourth rows SS-3 and SS-4, respectively, at the second station. The tooling of the second row FS-2 is offset relative to the tooling of the first row FS-1 in a direction transverse to the direction in which the stock material SM is fed into the press, thus the centers of the tooling of the first and second rows are positioned in a staggered or zig-zag pattern across the press. Further, the tooling of the first and second rows are spaced from immediately adjacent tooling in the same row by a distance slightly less than the diameter of the blank removed from the stock material. Details of such a press and tooling are disclosed in copending U.S. application Ser. No. 467,818 filed Jan. 19, 1990 and assigned to the same assignee as this application.

As mentioned, the stock material SM is conveyed incrementally into the press between stock support plate SP and lower transfer plate LP (see FIG. 4) and thus is positioned in a location where it will not interfere with the transfer of the shells from the first to the second station. Further, the web or scrap skeleton WP remaining after the stock material passes through the first station is directed downwardly out of the press at a location between the second and third rows FS-2, SS-3. As the scrap skeleton WP passes from between the lower plate LP and stock support plate SP, it may be cut or chopped into smaller pieces. Area III of FIG. 3 shows in phantom lines the pattern formed on the stock material by the two rows of first station tooling. The holes HL left in the stock material SM are joined by thin web portions WP such that the amount of material in the scrap skeleton resulting from the blanking operation is minimized.

A chopper mechanism 102 appropriate for this purpose is shown pivotally mounted for chopping the material as it passes away from the stock support plate, and is described in more detail in copending U.S. application Ser. No. 467,472 filed Jan. 19, 1990 and assigned to the same assignee as this application. As seen in FIG. 4, the scrap skeleton WP passes from the rear edge of the stock support plate SP and is directed downwardly and into scrap chamber 106 located beneath chopper plates 108 of the chopper mechanism 102. As scrap WP enters chamber 106, it passes between the lower cutting edges 110 of chopper blades 112 attached to chopper plates 108 and the rearward upper cutting edges 114 of chopper blocks 116 mounted to die shoe DS. Chopper plates 108 are pivotally attached to support blocks 120 on die shoe DS. As cutting edges 110 pass cutting edges 114, a narrow strip of scrap skeleton WP is severed and is received into scrap chamber 106.

Tooling in the third and fourth rows SS-3 and SS-4 is arranged in alternating transverse locations similar to the lay-out of the first and second rows such that tooling of the first row FS-1 is aligned with the tooling of the fourth row SS-4 in a longitudinal direction with respect to the direction of conveyance of the stock material SM, and the tooling of the second row FS-2 is similarly aligned with the tooling of the third row SS-3.

The first station tooling, may be substantially as described in U.S. Pat. No. 4,561,280 issued Dec. 31, 1985. The first station tooling severs a blank from stock material SM and partially forms the blank into a shell preform comprising a substantially flat central panel and an upwardly extending chuckwall about the edge of the panel. The tooling includes means for forming a vacuum along a bottom surface of the tooling such that the partially completed shell or preform will be held against a knock-out and positioner element just prior to propelling the partially completed shell from the first station to the second station.

The second station tooling, which is shown generally in FIG. 4, is substantially as shown in FIGS. 6–10 of said U.S. Pat. No. 4,561,280, and forms a countersink at the base of the chuckwall of the partially completed shell. The second station tooling also includes means for forming a vacuum along a bottom surface of the upper portion of the tooling to facilitate lifting and holding the completed shell away from the bottom tooling for transferring the shell out at the press. In addition, the tooling of the second station is positioned along a transfer path of the conveyor means, for receiving and catching the partially completed shells from the first station tooling, during opening of the tooling, thus the preforms are formed into completed shells at the second station during the subsequent downstroke of the press ram.

To coordinate the press opening/closing motion with the many other functions of the tooling and related press equipment, the press is fitted with a rotary transducer TDR (of known type) which is driven in synchronism with the crankshaft CR. This transducer and its associated circuitry produces a regular train of output pulses which identify the rotational location of the crankshaft, and hence the position of ram RM, in terms of some convenient fraction of degrees of rotation from top dead center location of the ram. This forms the basic reference signal for the press control, as will later be described. A typical transducer is an Autotech 1250, available from Autotech Controls, Carol Stream Ill. 60188.

It should be noted that the upper working surface of each of the first through the fourth row lower tooling FLT-1, FLT-2, SLT-3, SLT-4 is located at substantially the same level as the stock feed level.

Referring to sections I and II in FIG. 3, the transfer paths between the tooling sets of the first and second stations are each formed as substantially horizontal paths of the conveying means defined by a pair of guide rails 10, 12 which guide the partially completed shells from the first row FS-1 of the first station to the fourth row SS-4 of the second station along the lower transfer plate LP, and pairs of guide rails 14, 16 guide the partially completed shells from each of the tooling sets of the second row FS-2 of the first station to the tooling sets of the third row SS-3 of the second station along the upper transfer plate UP. The paths formed by guide rails 10 and 12 are located substantially between the upper and lower plates and partially overlap the movement space of second and third row upper tooling FUT-2, SUT-3 which is defined by the area swept out by the lower portion of each of the upper tool members in their vertical movement toward and away from the lower tooling. Thus, the shell preforms from the first row FS-1 are conveyed through a part of the movement space and under at least a portion of the tooling second and third rows FS-2, SS-3 such that the transfer of the shell preforms along the lower plate LP must be performed at a time when the upper tooling for the second and third rows FS-2, SS-3 has cleared the lower transfer path.

The lower path of the conveying means is shown in FIGS. 5 and 6 wherein the guides 10 and 12 are formed with vertically extending walls 18, 20, respectively, and horizontally extending flanges 22, 24 protruding over the guide path. The guide path further includes a low friction plate 26 forming the bottom surface of the guide path. The low friction plate 26 includes a pair of longitudinally extending raised beads 28 which form contact points with the shell preforms as they travel in free flight from the first to the second stations. The preforms will have a minimum amount of contact with the boundary surfaces formed by the guides 10 and 12 and the plate 26 such that the preforms will not be slowed by frictional forces as they are conveyed from the first to the second stations.

As may be further seen in FIG. 5, the end of each guide path is provided with a catch mechanism 30 for capturing and locating the shell preforms at the second station, in cooperation with the conveyor means. The catch mechanism includes a pair of side members 32, 34 which are mounted to a base member 36 for pivotal movement about horizontal axes 38, 40, respectively, longitudinally aligned with the direction of the guide path. The side members 32, 34 are each provided with a cam wheel 42, 44 which is positioned for engagement with a cam 46 (see FIG. 4) mounted to the upper portions SUT-3, SUT-4 of the second station tooling sets.

The catch mechanism includes arcuate fingers 48, 50 located within and extending along an interior portion of each of the side portions 32, 34, and spring loaded for movement in a direction transverse to the transfer direction of the shell preforms. As preform enters the catch mechanism 30, fingers 48, 50 move outwardly to allow the preform to enter the mechanism and then partially surround it to hold it in place. As the upper portions SUT-3, SUT-4 of the second tooling sets move downwardly, the cam 46 engages the rollers 42, 44 to pivot the side portions 32, 34 outwardly and thus allow the upper portions SUT-3, SUT-4 of the second tooling sets to engage the preforms without contacting catch mechanism 30.

In order to accommodate the overlap between the transfer path on the first level or lower plate LP and the upper tooling FUT-2, SUT-3 of the second and third rows, the guide rails 10, 12 include cut-out portions 52, 54 which correspond in shape to the outline of the upper tooling. Since the partially completed preforms travel along the transfer paths with a minimum amount of contact with the walls of the guides 10, 12, the interruption in the guide path, which occurs at the intersection of the guide rails 10, 12 with the tooling location of the second and third rows FS-2, SS-3, will not significantly affect the guiding of the preforms as they travel from the first row FS-1 to the fourth row SS-4. The transfer paths formed by the guide rails 14, 16 on the second level or upper plate UP are formed with substantially the same structure as that used for the lower transfer paths defined by the guide rails 10, 12 and the low friction plate 26.

As shown in FIGS. 4 and 5, there are sensors SEN-1 and SEN-2 located along the transfer paths to detect passage of preforms, first into the second stage tooling, and then out of the press, for each lane. These sensors are known optical devices, and comprise a sending and receiving unit arranged on opposite sides of the paths, with the light beam interrupted by passage of a shell. A suitable sensor apparatus is available from Banner Engineering Corporation, Minneapolis Minn. under its trademark OMNI-BEAM. Thus, a signal is supplied to the press control from each sensor SEN-1 each time a preform passes into the second stage tooling, and each time a completed shell exits the second stage tooling a signal is supplied from the sensors SEN-2, for each lane in the entire press tooling apparatus.

Referring now to FIG. 4, it can be seen that the upper tooling FUT-1, FUT-2 of the first and second rows each include knock-out and positioner elements 56 and 58, respectively, having upper portions 60, 62 extending into apertures in the punch holder PH and which function in the same manner as the knock-out and positioner elements described in said U.S. Pat. No. 4,561,280.

First and second row knock-out stems KOS-1, KOS-2, respectively, are mounted to a stationary bar 64 extending transversely across the press in the space defined between the bottom surface of the ram RM, the risers RS and the upper surface of the punch holder PH. The bars 64 are positioned, and the vertical dimension of the risers is selected, such that the ram and punch holder may move between their upper and lowermost positions without contacting bar 64.

The stems KOS-1, KOS-2, extend from the bottom of the bar 64 and are positioned such that they will enter the apertures containing the portions 60, 62 during an upstroke of the ram and punch holder. As the stems KOS-1, KOS-2 enter the punch holder, they will contact the upper portions 60, 62 of the knock-out and positioner elements 56, 58 and thereby limit the upward movement of elements 56, 58 as the upper tooling FUT-1, FUT-2 is carried upwardly, such that the lower surfaces of the elements 56, 58 carrying the preforms from the level of the stock material will be located slightly above first and second transfer levels, respectively.

Each tooling set of the first and second rows FS-1, FS-2 is provided with a nozzle 64, 66, each nozzle being mounted on the lower plate LP and having an orifice located at the lower and upper transfer levels for supplying a sudden burst of pressurized air to apply an edgewise force to the shell preforms held by the knock-out and positioner elements 56, 58 such that the vacuum force holding the preforms to these elements is overcome and the preforms are propelled edgewise toward the second station. The nozzles 64, 66 may operate in substantially the same manner as in the transfer system disclosed in U.S. Pat. No. 4,770,022, issued Sep. 13, 1988. Nozzles 64, 66 are supplied with pressurized air from a manifold structure 68 which is mounted to and extends transversely across the upper surface of the lower transfer plate LP. The passages 70, 72 are connected to their respective nozzles by means of flexible tubes 74, 76 and at least one valve controls the flow of air into each of the passages 70, 72 for energizing the nozzles 64, 66.

It should be noted that air flow to the lower nozzles 64 is controlled such that it will be effective to propel the preforms to the second station only after the first station tooling has opened sufficiently to locate the upper tooling FUT-1, FUT-2 above the first or lower level transfer path. Similarly, the air flow to the upper nozzles 66 is controlled such that it will be effective to propel the preforms to the second station only after the second row upper tooling FUT-2 is located above the second or upper level transfer path.

The upper tooling SUT-3 and SUT-4 of the third and fourth rows each include form punch and positioner elements 78 and 80, respectively, having upper portions 82, 84 extending into apertures in the punch holder PH and which function in the same manner as the form punch and positioner elements described in said U.S. Pat. No. 4,561,280.

Third and fourth row knock-out stems KOS-3, KOS-4 are mounted to stationary bars 86 and 88, respectively, which extend through spaces defined between the bottom surface of the ram RM, the risers RS and the upper surface of the punch holder PH in a manner similar to the bar 64. The function of the stems KOS-3, KOS-4 and the upper portions 82, 84 in positioning the lower surfaces of the form punch and positioner elements 78, 80 is identical to the operation of the stems KOS-1, KOS-2 and upper portions 60, 62 in positioning the lower surfaces of the first station knock-out and positioner elements 56, 58.

Each tooling set of the third and fourth rows SS-3, SS-4 is provided with a nozzle 90, 92, each being mounted on the upper plate UP and having an orifice located above the lower and upper transfer levels, respectively. The nozzles 90, 92 operate in the same manner as the nozzles 64, 66 of the first station and apply an edgewise force in the form of a burst of air to forcibly overcome the vacuum force holding the completed shells to the lower surface of the form punch and positioner elements 78, 80 and propel the shells out of the press in the same direction as the shells are conveyed from the first to the second stations.

The nozzles 90, 92 of the second station, in the embodiment shown, are supplied with pressurized air from a pair of manifold tubes 94, 96 which are mounted to the upper plate UP and which are connected to the nozzles by means of flexible tubes 98, 100. The manifold tubes 94, 96 are each connected to a source of pressurized air via a control valve in a manner similar to that described for the manifold passages 70, 72 of the first station such that the fourth row nozzles 90 will be effective to propel the completed shells from the press only after the upper tooling SUT-3, SUT-4 has separated from the lower tooling SL-3, SL-4 and risen above the first or lower level transfer path and the third row nozzles 92 will only be effective to propel the completed shells from the press only after the third row upper tooling SUT-3 has risen above the level of the second or upper transfer path.

It should be apparent that the path traversed by the preforms traveling from the first row FS-1 of the first station to the fourth row SS-4 of the second station is greater than the distance traversed by the preforms from the second row FS-2 of the first station to the third row SS-3 of the second station and thus the transfer time on the upper transfer level will be less than the transfer time on the lower transfer level. It should also be apparent that the transfer of the preforms from row FS-1 of the first station to the second station is initiated prior to the time at which the second row preforms reach the upper transfer level. Thus, although the upper level transfer is initiated later than the first level transfer, the preforms on the upper level traverse a shorter distance and therefore will still reach the second station prior to the time at which the upper tooling SUT-3 of second station reaches the upper transfer level in its downward movement for carrying the third row shell preforms toward the lower tooling to form them into a completed shells.

The exiting shells pass the exit sensors SEN-2 as the shells are propelled from the tooling. It should be noted that although the completed shells of the third row SS-3 must pass between the form punch and positioner elements 80 of adjacent fourth row upper tooling, the shells will not contact the form punch and positioner elements 80 in their passage out of the press since the completed shells are of a significantly smaller diameter than the blank from which they were formed and thus of a small enough diameter to pass freely between the fourth row tooling elements.

In addition, it should be apparent that as the fourth row upper tooling SUT-4 moves to a position above the lower transfer path, the cam members 46 thereon disengage from the cam wheels 42, 44 of the lower level catch mechanism 30 such that these mechanisms are now operational to capture preforms arriving from the first station. Similarly, as the third row upper tooling SUT-3 moves upwardly above the second or upper transfer level, the cam members 46 thereon disengage from the cam wheels 42, 44 on the upper level catch mechanisms 30, which mechanisms are then operational to capture preforms arriving from the second row FS-2 of the first station.

Access to Transfer Mechanism

The press includes means for selectively moving the ram RM above its upstroke position to provide access to the transfer plates UP, LP and support plate SP mounted to the base of the press. In addition, the transfer plates UP and LP are each provided with a set of extendable cylinders such that the plates of the press may also be selectively lifted to provide access to different levels of the tooling.

As may be best seen in FIGS. 1, 2 and 7, the ram RM of the press includes cylinder portions CP formed therein for engaging pistons P which are attached to the bottom ends of the cylinder members CM extending from the press crown C. In the operational position of the ram, as seen in FIGS. 1 and 2, the piston P is located in the top of the cylinder portion CP and the lower portion of the cylinder portion CP is filled with a pressurized fluid which is maintained at a pressure sufficient to prevent movement of the piston P within the cylinder portion CP during operation of the press ram RM. Thus, the weight of the ram and the pressurized fluid within the lower part of the cylinder portion CP act to maintain the ram in a lowered position with respect to the cylinder members CM during the reciprocating motion of the ram as it is driven by the cylinder members CM.

When it is desired to raise the ram above its upstroke position, the pressurized fluid in the cylinder portions CP may be transferred to the upper part of the cylinder portion such that the piston P and the lower portion of the cylinder member CM move toward the lower part of the cylinder portion CP resulting in upward movement of the ram RM, as seen in FIG. 7. In an actual embodiment, the ram can be moved upwardly at lest $6\frac{3}{4}$ inches (17.15 cm) from its upstroke position.

In order to accommodate the upward movement of the ram, the kick-out bars 64, 86, 88 are mounted on extendable kick-out bar cylinders 104 which are attached to a fixed point relative to the crown C of the press at one end thereof. The other end of the cylinders 104 are attached to connecting beams 106 which mount the kick-out bars 64, 86, 88 for movement with the cylinders 104. Support members 108 are mounted on each side of the press base and support the beams 106 when the cylinders 104 are extended to position the kick-out bars 64, 86, 88 in their lowermost position to thereby locate the kick-out stems in their operational positions.

When it is desired to raise the ram RM above its upstroke position, the cylinders 104 are first actuated such that the kick-out bars 64, 86, 88 move upwardly away from the punch holder PH until they engage the bottom surface of the ram RM. Subsequently, the fluid in the cylinder portions CP of the ram RM is transferred from the bottom to the top of the pistons P such that the ram RM is forced upwardly, and the kick-out bars 64, 86, 88 continue their upward movement while maintaining contact with the lower surface of the ram RM until the ram and kick-out bars assume an uppermost position, as depicted in FIG. 7.

In order to provide further access to the transfer plates and tooling mounted on the base of the press, a first set of extendable cylinders 110 are carried on the base of the press and pass through the lower transfer plate LP to connect to the upper transfer plate UP such that extension of the first set of cylinders 110 causes the upper plate UP to be lifted away from the lower transfer plate LP. A second set of extendable cylinders 112 are mounted on the base of the press and are connected to the lower transfer plate LP such that extension of the first and second set of cylinders 110, 112 together causes the lower and upper plates LP, UP to be lifted together away from the base of the press to thereby expose the stock support plate SP.

Figure 8:
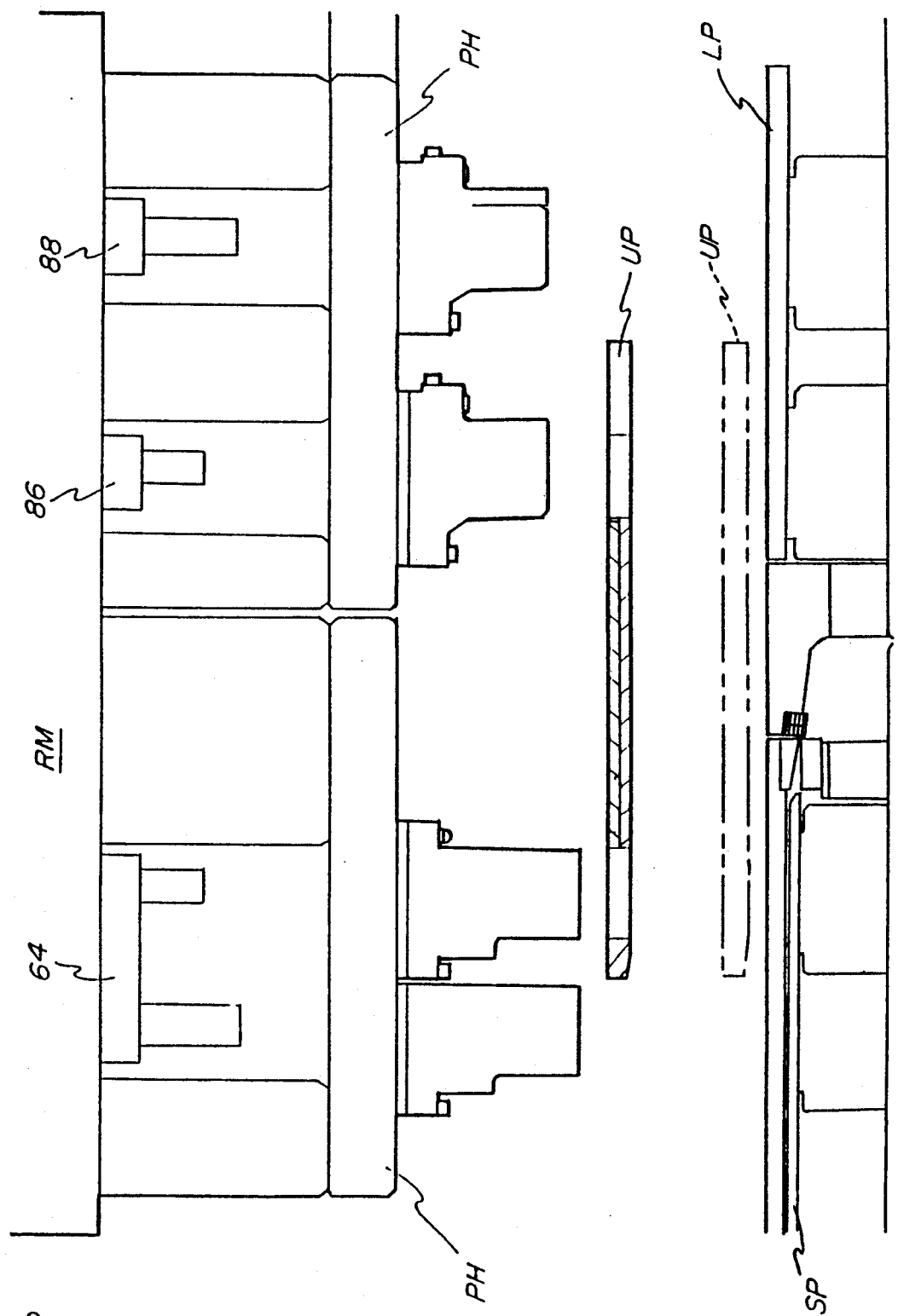
FIGS. 8, 9 and 10 are diagrammatic views in which, respectively, the upper transfer plate is shown in its uppermost position away from the base of the press, the upper and lower transfer plates are lifted to their uppermost position, and in which the stock support plate also is lifted to an uppermost position.
Figure 9:
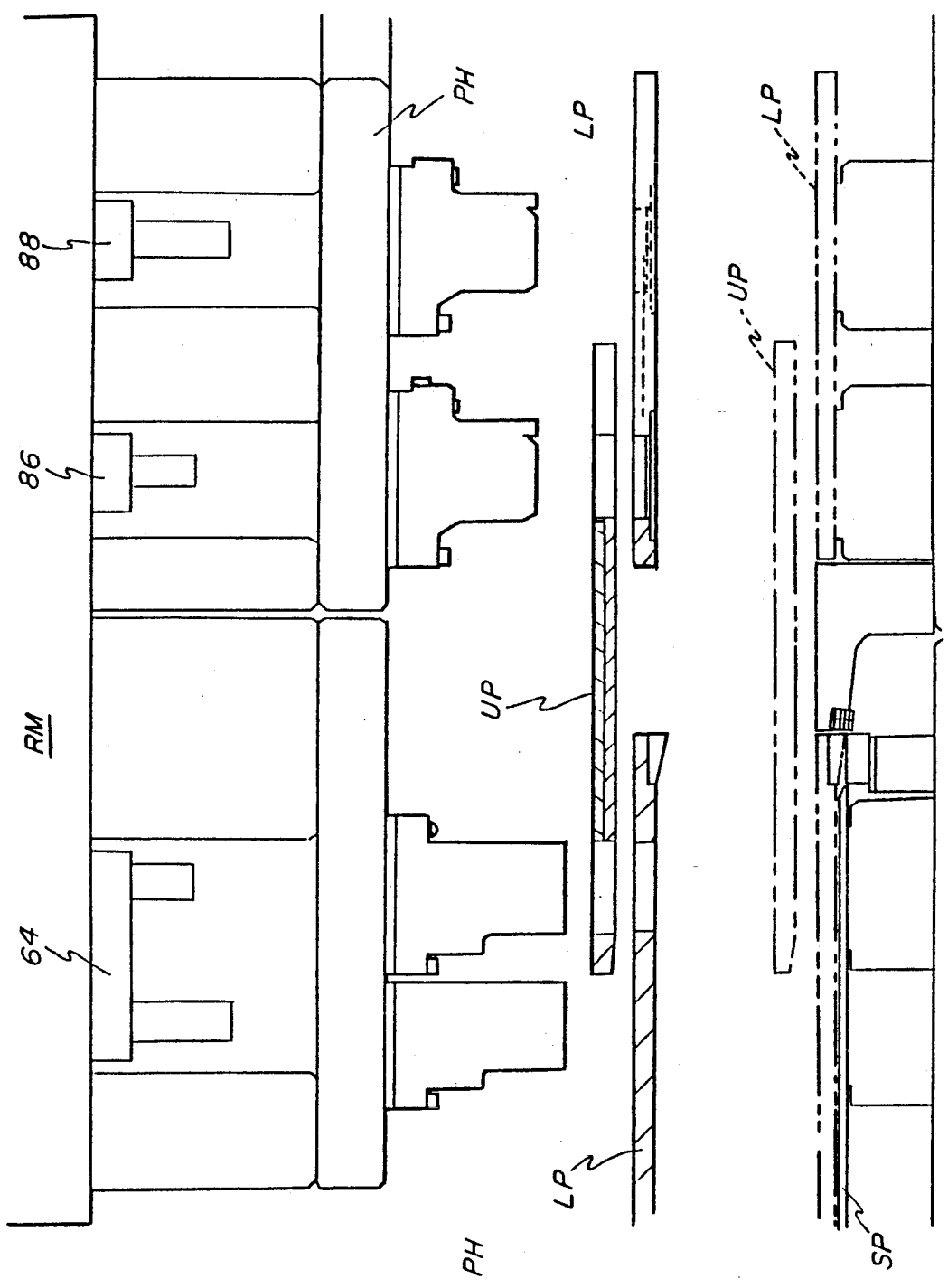
Figure 10:
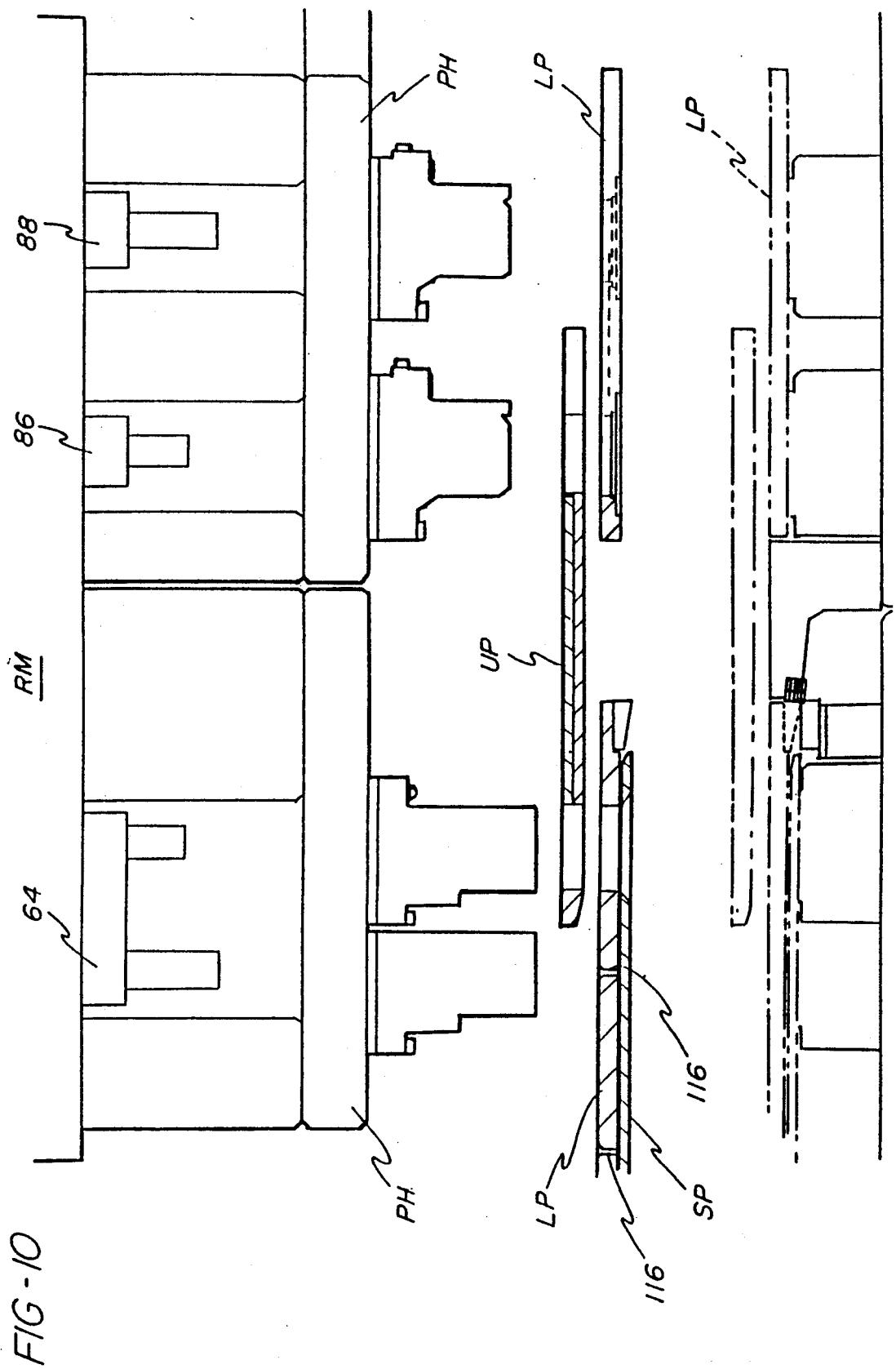

FIGS. 8–10 show the various combinations in which the plates may be lifted above the base of the press; the operational positions of the lifted plates are shown with phantom lines. FIG. 8 shows the first mode of lifting in which only the first set of extendable cylinders 110 are actuated to cause the upper transfer plate UP to rise above the lower transfer plate LP to thereby expose and provide access to the lower transfer path. It should be noted that the lower guide rails 10, 12 positioned between the upper and lower transfer plates WP. LP may be attached to the upper transfer plate UP so as the upper transfer plate is lifted, the lower guide rails 10, 12 are also lifted away from the lower plate LP.

FIG. 9 shows a second mode of operation in which both the first and the second sets of extendable cylinders 110, 112 are actuated such that the upper and lower transfer plates UP, LP are lifted simultaneously above the base of the press. This second mode of lifting exposes and provides access to the stock support plate SP and the feed level of the web material.

FIG. 10 shows a final mode of lifting in which the stock support plate SP is attached to a front portion of the lower transfer plate LP by means of appropriate fasteners such as bolts which are depicted generally at 116. This mode of lifting is similar to that of FIG. 9 in that both the first and second sets of extendable cylinders 110, 112 are simultaneously actuated to thereby lift the upper and lower transfer plates and the stock support plate together and thereby expose the lower tooling members mounted on the base of the press.

Press Control System

Figure 11:
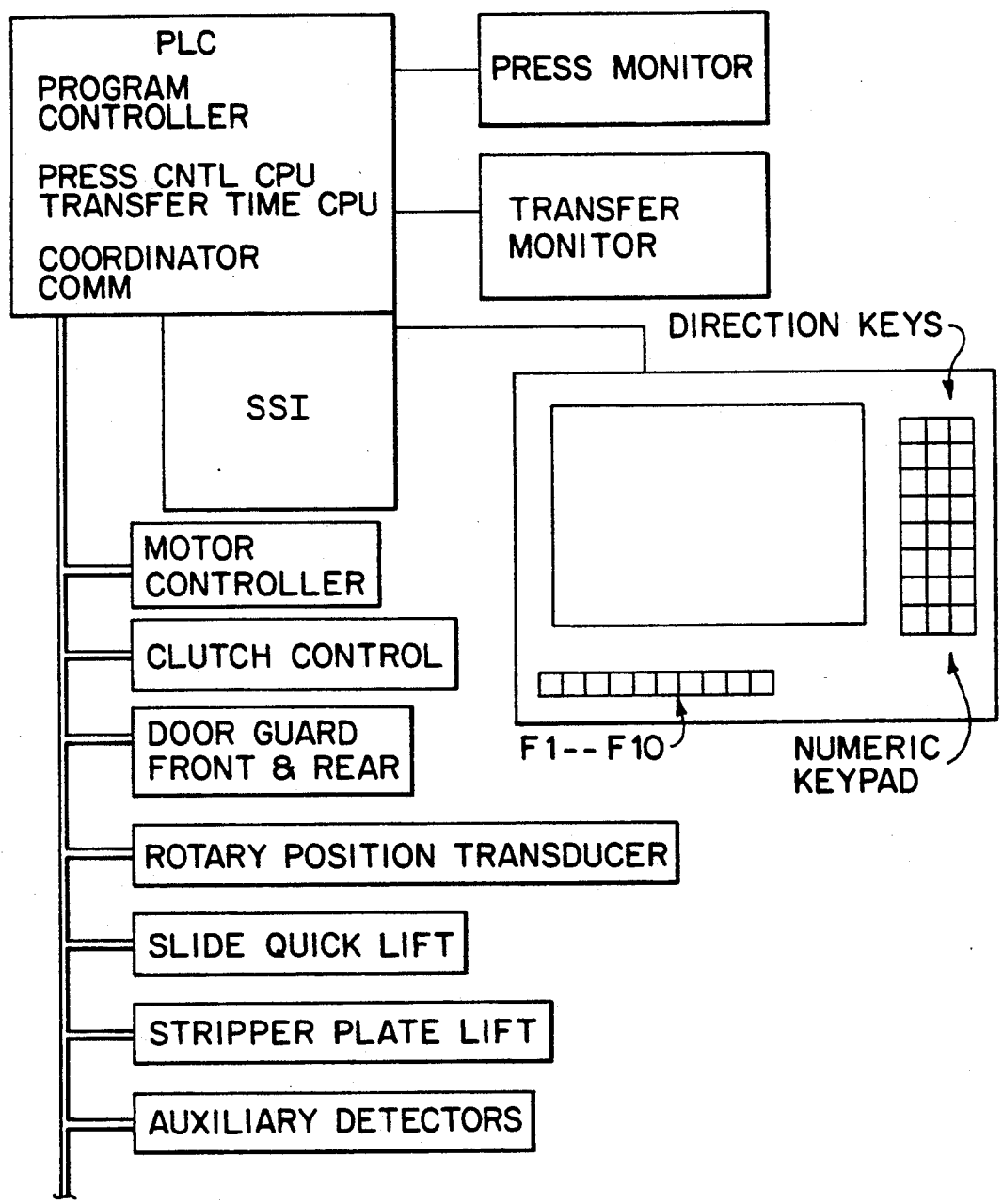
FIG. 11 is a block diagram of the control system provided by the invention, showing the general relationship of the press to the programmable controller PLC and the interface SSI and its display device.

Referring to FIG. 11, which shows the organization of the press control system, a programmable controller PLC is used to govern the over-all press operation. Typical such controllers are Siemens model S5 135 U or an Allen-Bradley PLC2 family (available from Allen-Bradley Co., Inc., Milwaukee Wis. 53204). Operator input/output is provided through an interface device such as a Smart Screen interface SSI (available from Total Controls Products, Inc., Berkeley Ill. 60163). For programming purposes an ASCII keyboard (not shown) can be attached to the PLC and to the SSI. In an actual installation, the PLC and SSI provide operator interface with a color monitor CRT, a set of associated functions keys (F1–F10), a screen direction keypad for moving items about the CRT display, and a numeric keypad which includes keys for numerals 0–9, "enter", "backspace/delete", and the characters ",-." . The PLC of choice (i.e. Allen Bradley), and the interface SSI, are thus per se known. The Smart Screen interface is plug-compatible with Allen-Bradley PLCs (among others). This system functions when properly programmed to operate the press through its various set-up, jog and run modes, using various detectors (as later described) to monitor different areas of the press and tooling, and to inhibit some or all of press and tooling operations if a malfunction or potential malfunction condition is detected. Details of the PLC and SSI are available from their associated manuals and documentation.

The present novel control system is achieved by programming controller PLC in known manner, connecting interface SSI to the PLC, and programming the interface. In particular use of the SSI's menu driven Smart Screen Editor which is a Computer Aided Design style of program that provides to the designer the ability to create color graphic displays, or screens, and to make such displays dynamic by associating (e.g. tying) areas or objects on the displays to variables and/or register values in the PLC.

The displays or screens are created and saved in a Picture file, which is a software definition of the visual display used by the SSI to recreate that display on the CRT. The Picture file also includes any dynamic parts assigned a variable in the PLC. An associated Key file is created which defines how the function keys (F1–F10) will work for that particular static/dynamic screen. Also an associated Screen file is created which contains the information linking the associated Picture and Screen files, and controls the selection of displays by the PLC.

Thus, by providing unique software based interactive displays, which can also be selected by operator intervention at the keypads, and by causing some of this SSI display software to monitor the press and tooling actively, the over-all control system provides detailed control function and control information, together with prompts and help messages, and also indicates the location/origin of various incipient or actual faults or malfunctions. The active screens provide means to sense variables in press conditions, static or running as the case may be, and to signal via the SSI the status, faults or incipient faults, and/or need for operator intervention, in connection with the starting, operating, and maintenance of the system. In addition, these active screens function as a means for providing help messages, on additional related screens, to assist the system operator.

A high resolution rotary position transducer TDR is driven from crank CS and provides an output defining the angular position of the crank, and thus the ram, with respect to top dead center which is 0, where the ram is at the top of its stroke. The output of transducer TDR is fed to the controller PLC.

The motor controller MC is a conventional device which controls the supply of electrical power to motor M, and the clutch controller CC provides on/off signals to the main clutch CL at the rotary power input from motor M to the crank CS. The clutch controller CC is thus also controlled by appropriate connection to controller PLC.

Around the working area of the press, surrounding the tooling and the ram RM, there are gates or doors which are lowered into protective location, and raised for access, by electric winches. Limit switches indicate the full raised door positions, and further safety limit switches indicate the doors are down into the guarding position. The door winches are under the control of a controller DGC which supplies power and reversing signals to these winches according to signals from the controller CRT.

Lifting of the ram RM above its normal top dead center position, as described in connection with FIG. 7, is controlled by the slide quick lift control QLC, which actuates the kick-out bar cylinders 104, and then actuates appropriate flow of hydraulic fluid to ram cylinders CP. The controller oversees this operation to assure the ram is in the correct position for such an operation, and then allows the jog control to raise the ram, by filling the cylinders CP, to its limit. To reverse this operation, the operator must hold a DOWN switch until the ram reaches its full down position, at which sensors detect the pressure build up in cylinders CP and actuate a down latch circuit. Premature release of this manually controlled circuit will cause the ram to return to its raised location.

Figure 15:
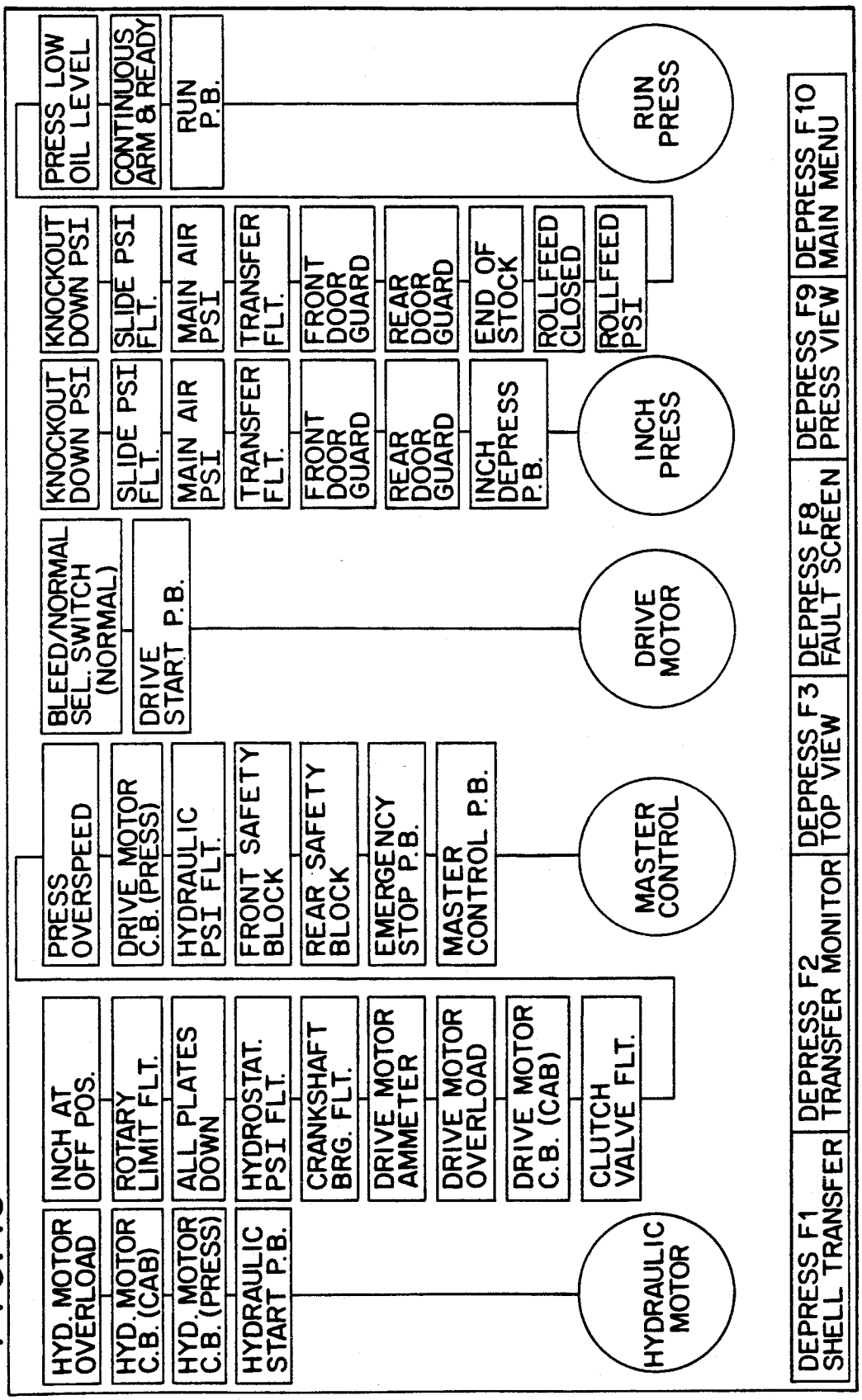
Figure 31:
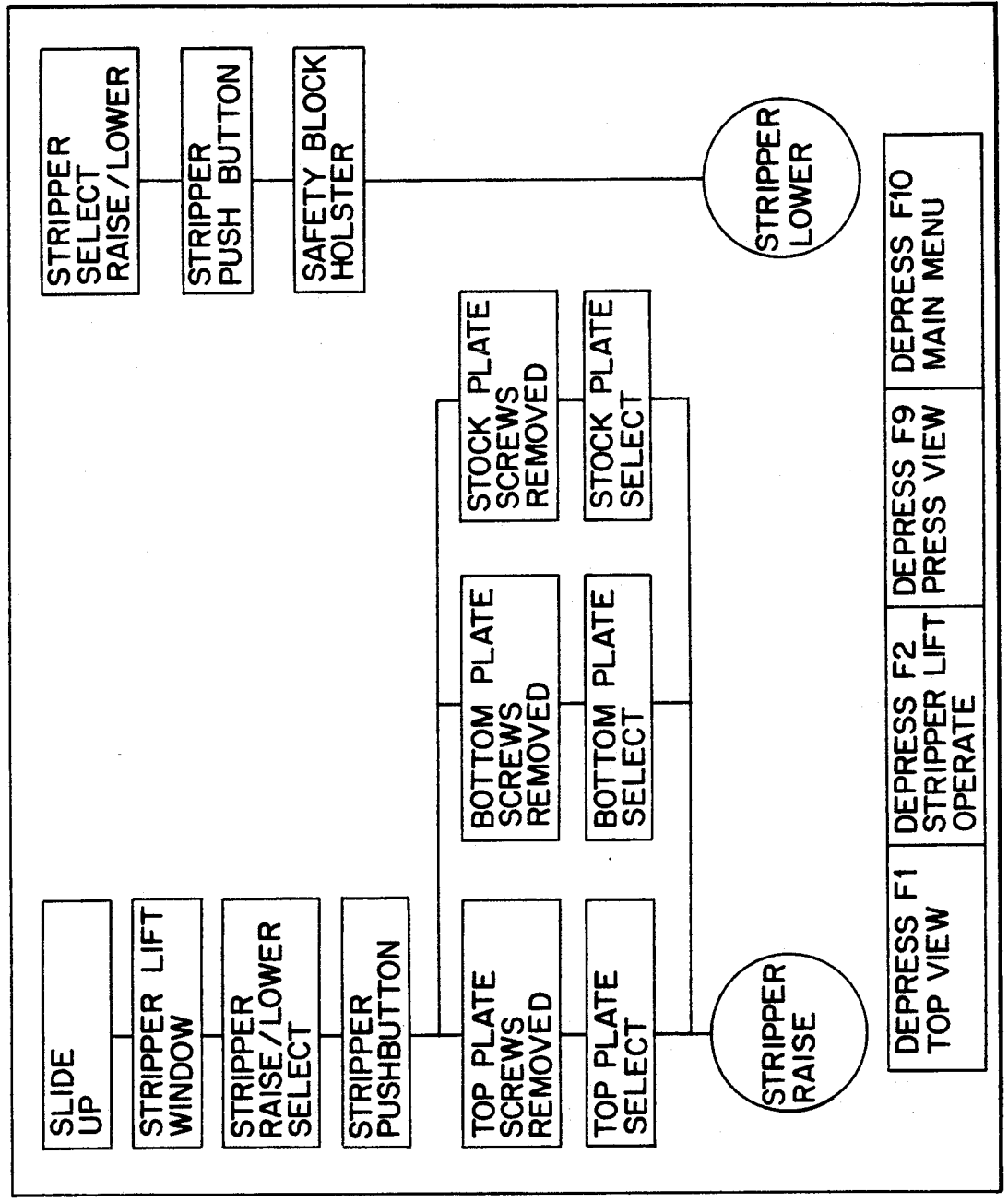
Figure 34:
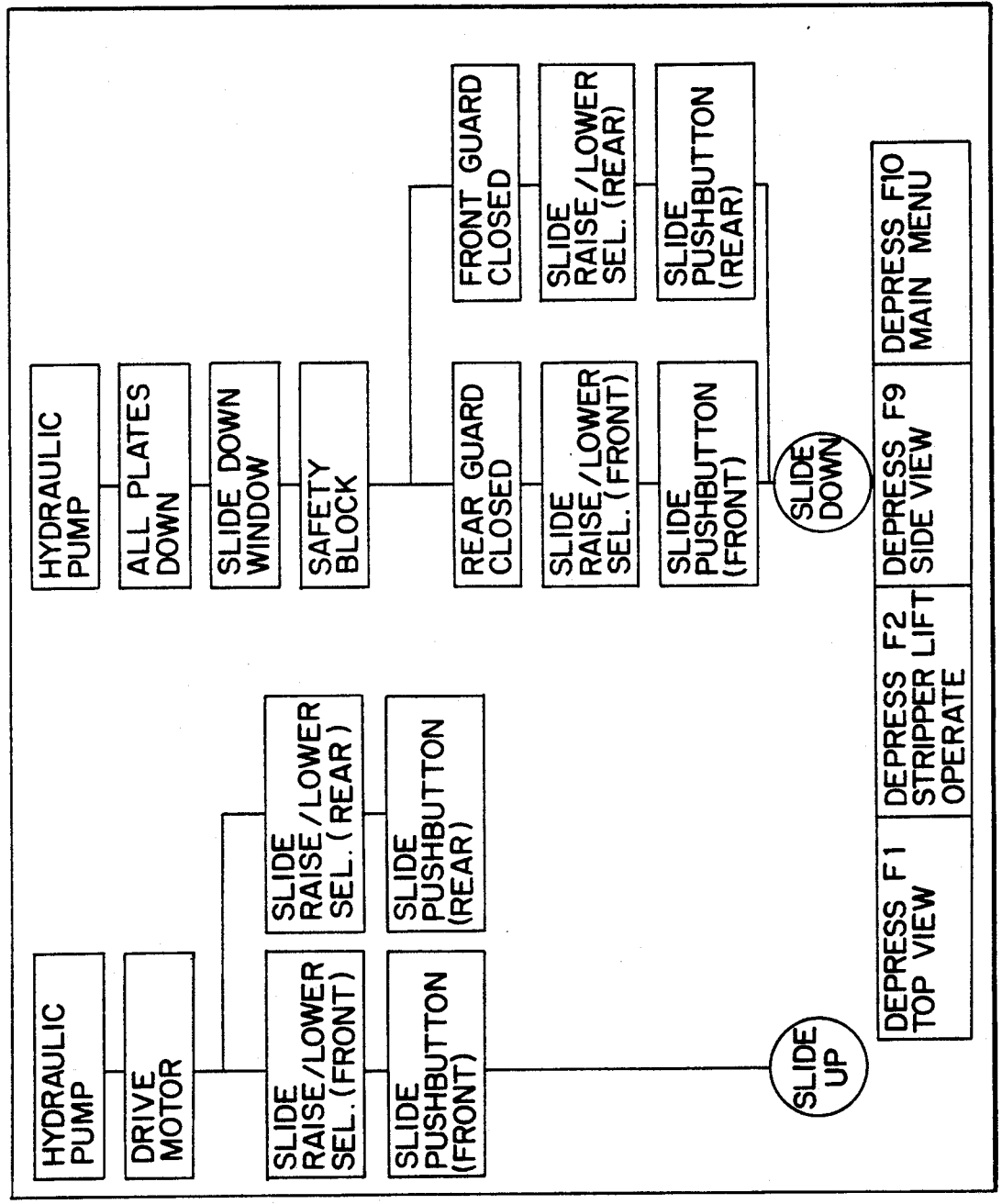

The control system disclosed in this preferred embodiment includes thirty screens or video displays, many of which are interactive with the PLC software. FIGS. 12-A, 12-B and 12-C constitute a flow chart illustrating the interrelation of the screens. FIGS. 13 and 14 are menus which, through use of designated ones of the ten function keys (F1–F10) located below the CRT monitor( FIG. 11), allow the operator to move to one of those other displays. FIGS. 15, 31 and 34 are flow chart displays which relate to sequential press control operations. They show go/no-go status (green background in a box for go, red background for no-go) for the condition of the hydraulic motor, the master press drive control circuit, the main drive motor M, and conditions required to be met for inching or running the press.

FIGS. 16, 23, 25, 27 and 29 are graphic displays which show different views of the press with superimposed control information and indicators. Indicators which indicate the labelled devices are either not on (background color/white in the circles), on and able to function (green in those circles), or a fault at one or more devices (red within the circles). In other words, on-off indications are shown in circles which are white if the monitored device is not powered, and green if it is active (under power); adjacent fault indicators (FLT) circles are illuminated green if no fault exists, and change to red if a fault is indicated. This indicating convention is used in all press views.

Figure 32:
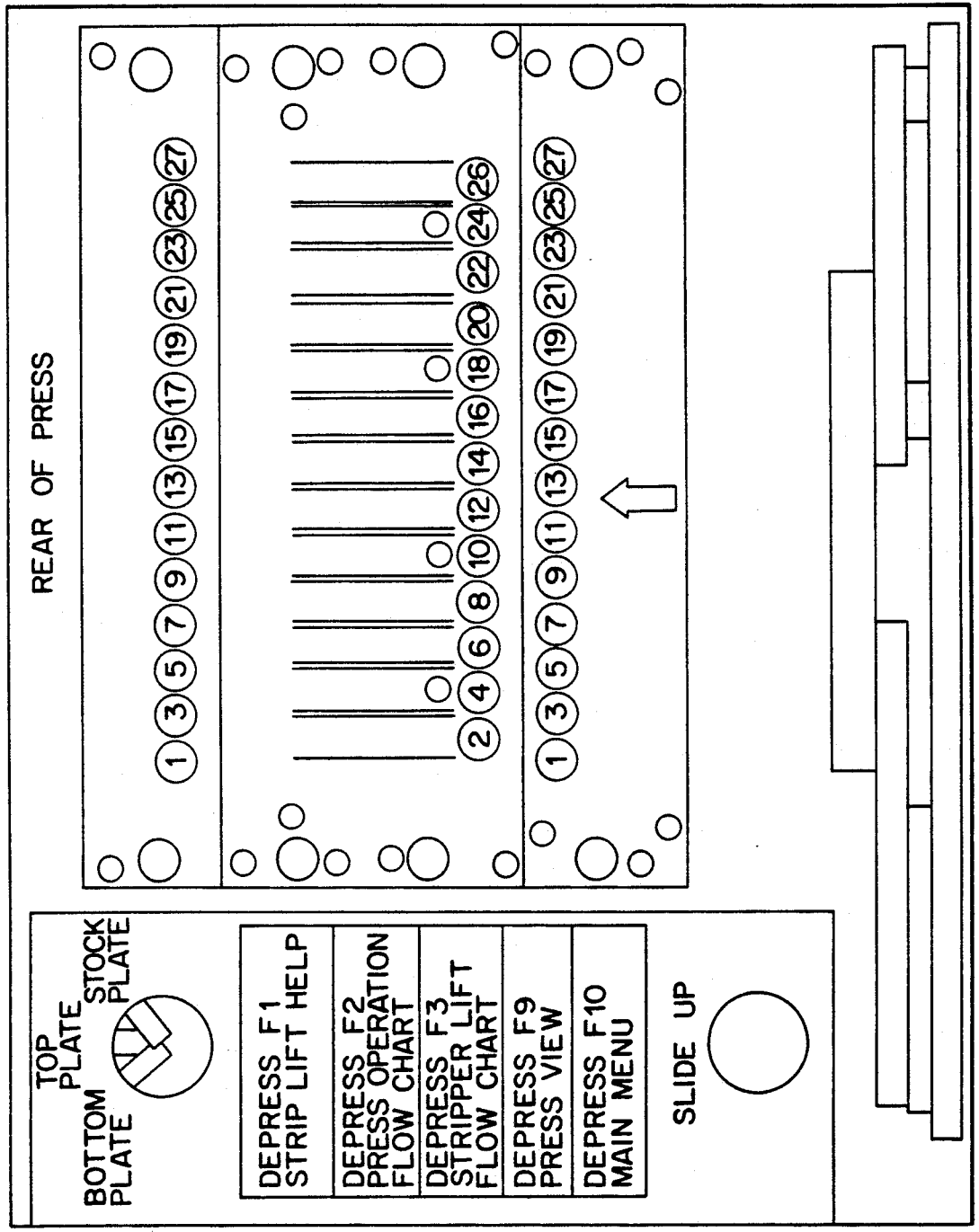
Figure 35:
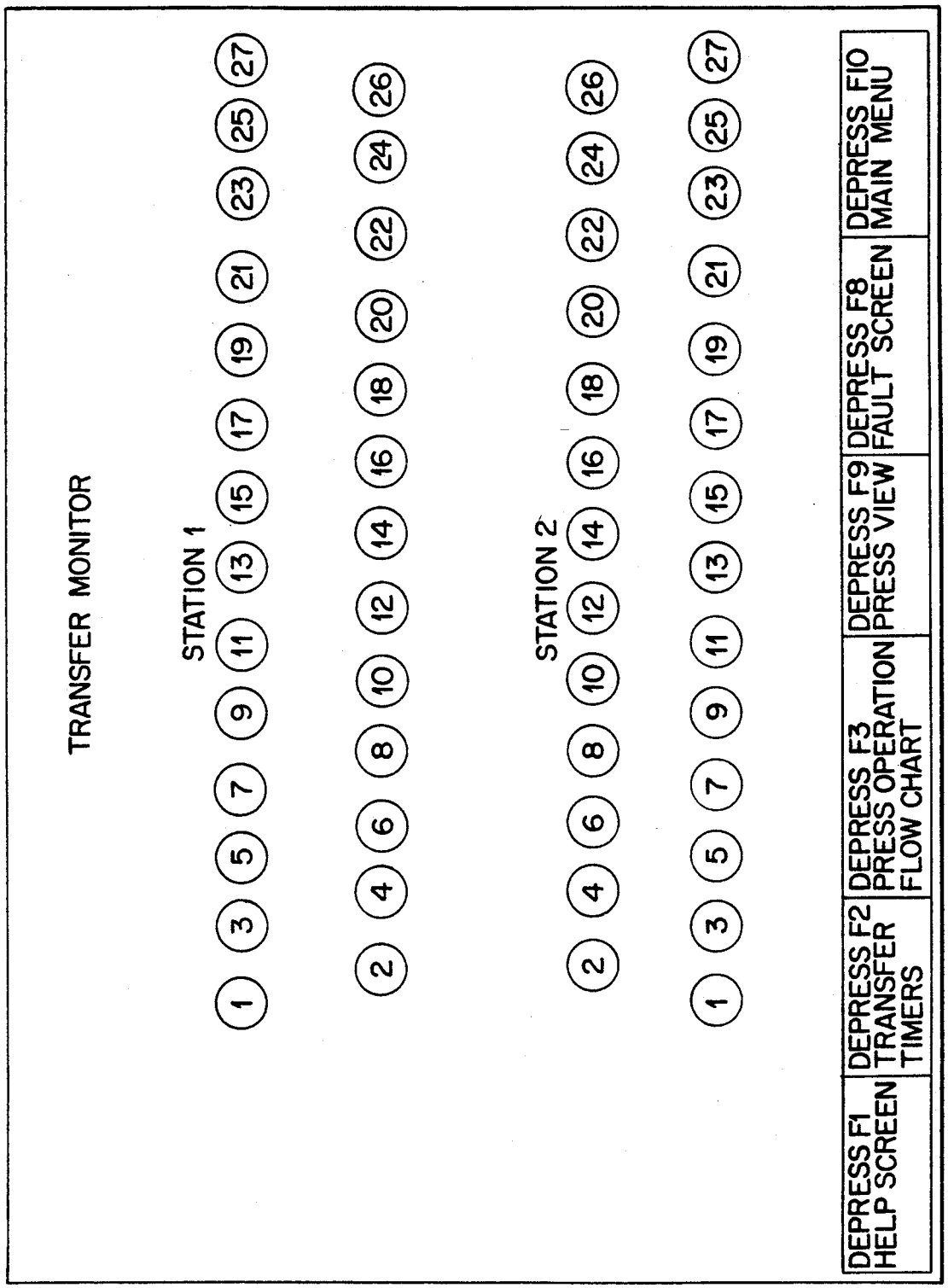
Figure 36:
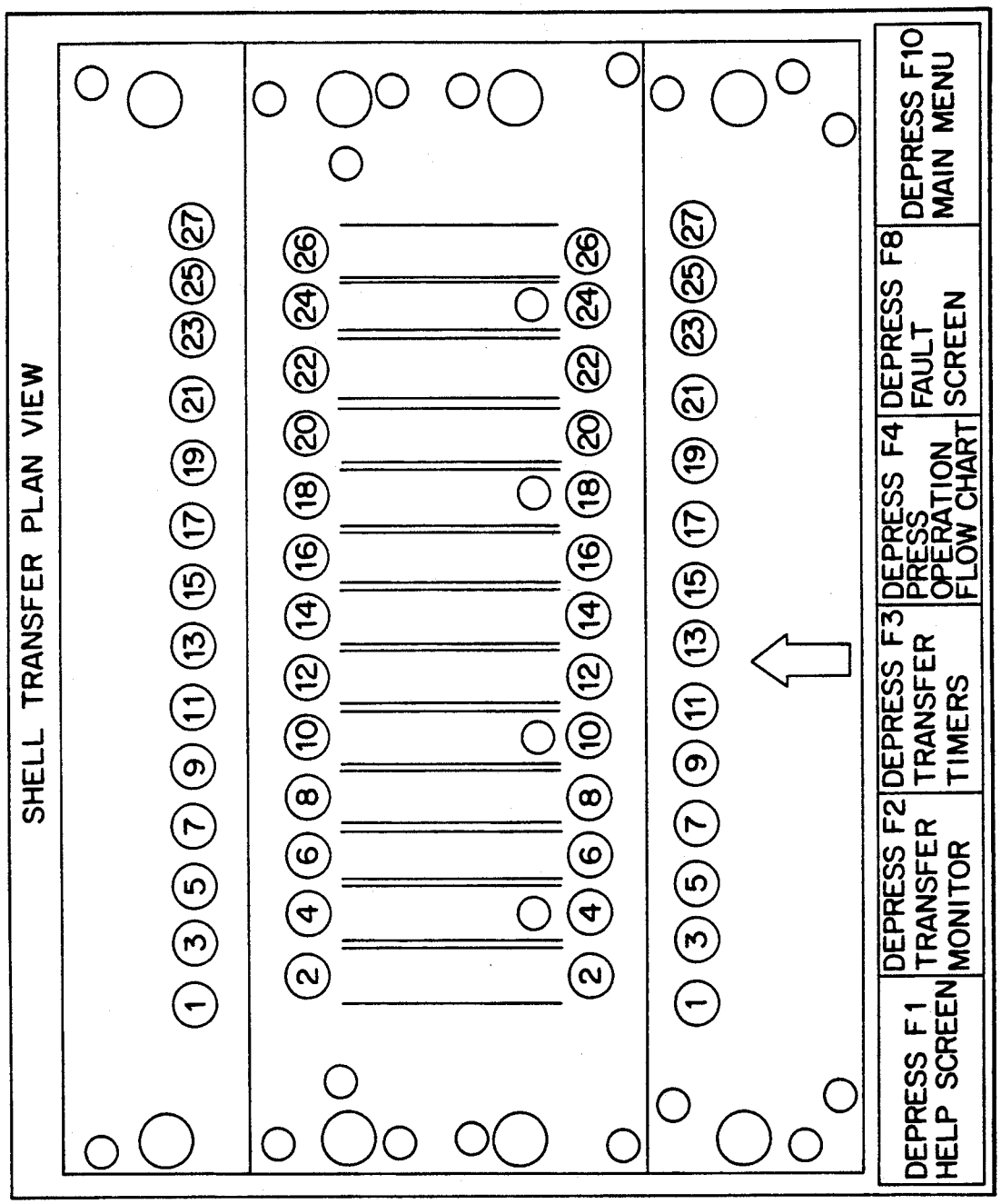

FIGS. 32, 35 and 36 are graphic displays relating to features of the tooling in the press. FIG. 40 is a screen which displays timing information for preform transfers occurring in the tooling when the press is operating. By observing this display, an operator can ascertain which, if any, of the tooling lanes and transferring fluid conveyors might be experiencing delay which could lead to a fault.

Figure 41:
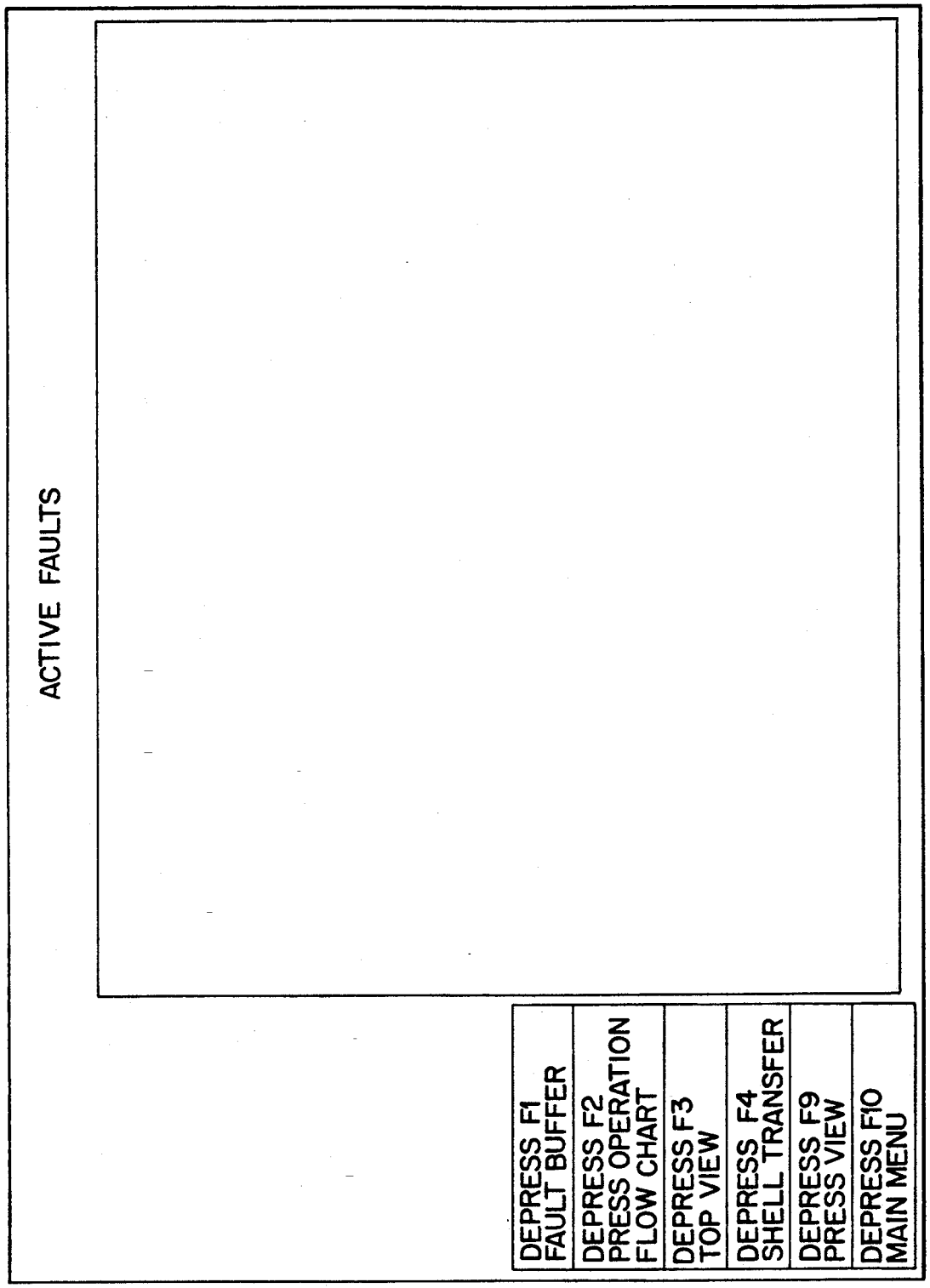
Figure 42:
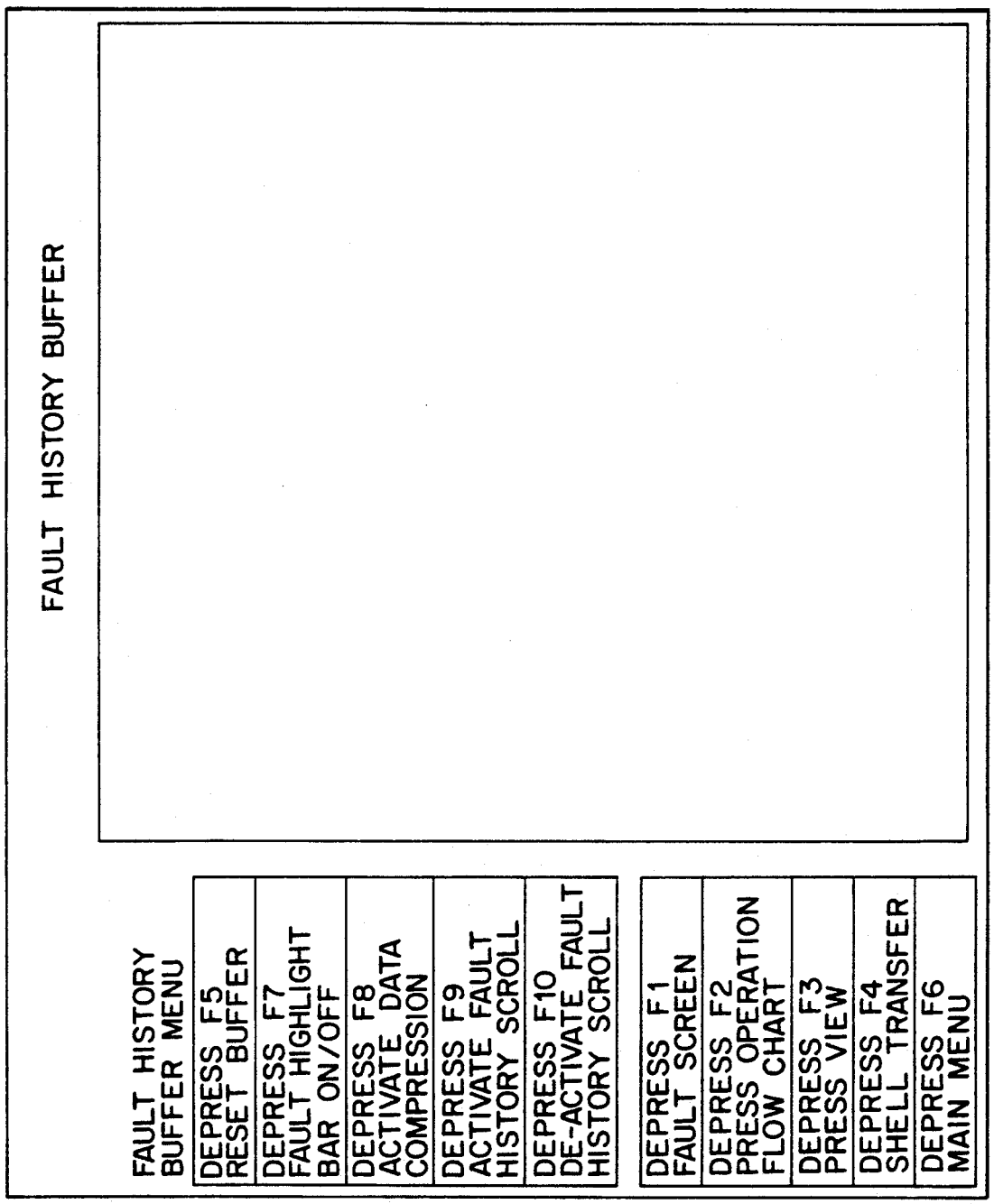

FIG. 41 is a screen display on which active faults are listed for the operator's information, and FIG. 42 is a screen display on which the last occurring faults are accumulated and displayed. The listing portions of these displays are shown blank, as they would be upon start-up of press operation, while the instructions for proceeding to other displays are illustrated.

The remaining displays are "help screen" message displays which assist the operator in diagnosing and responding to fault conditions. All displays include instructions allowing the operator to progress to related other displays from the one showing on the monitor, using an appropriate one of the function keys (F1–F10) on the console, as indicated.

Referring to the depictions of the displays, which will appear one at a time on the color CRT, FIG. 13 is the main menu; its function is to direct the operator to any of nine different displays, each of which may be selected by a corresponding function key F1–F9. FIG. 14 illustrates a submenu, reached from the main menu via function F9, identifying and providing a selection of five different press diagrams, as stated thereon.

FIG. 15 illustrates the display of the active press operation flow charts. It shows go/no-go status (green background in a box for go, red background for no-go) for the condition of the hydraulic motor, the master press drive control circuit, the main drive motor M, and conditions required to be met for inching or running the press. The function keys provide routing to other displays which may be needed if there is a fault displayed in any of these control paths. If all boxes in any given flow chart path have green background, then the operation at the end of that flow chart is enabled.

Figure 16:
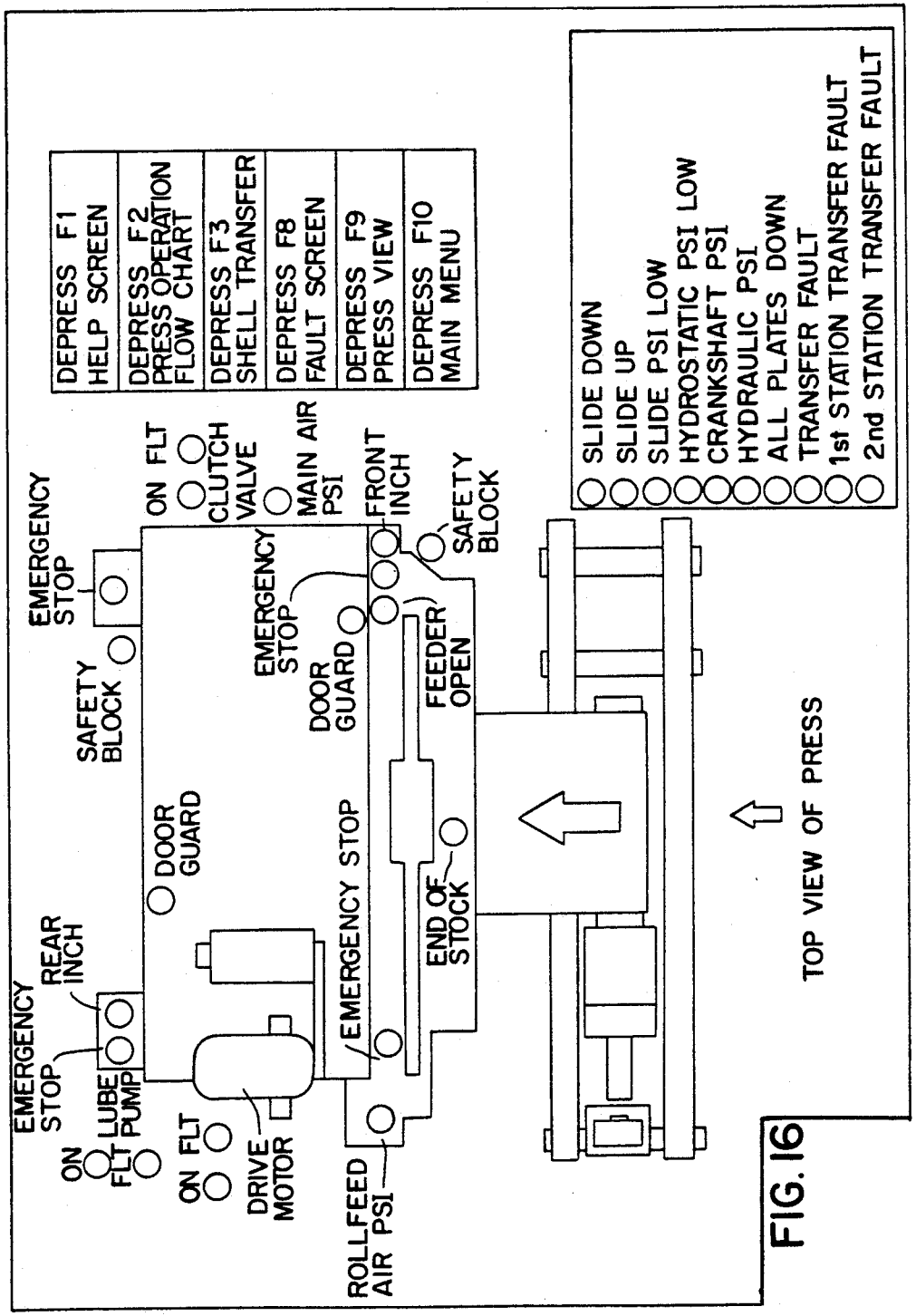

FIG. 16 is a dynamic display of the top view of the press, including the infeed apparatus, with various indicators which indicate the labelled devices are either not on (background color/white in the circles), on and able to function (green in those circles), or a fault at one or more (red within the circles).

FIG. 17 shows the help screen which is related to the top view (FIG. 16). This help screen includes descriptions of nine possible conditions observable on the FIG. 16 display. One or more of these messages may appear when this display is invoked. The messages include, in some cases, instruction for corrective or further action, while others are self-evident. Again, the display provides routing via function keys to other relevant displays.

FIGS. 18 and 19 show messages for drive motor fault/malfunction conditions. There are two displays because the needed messages do not fit within the confines of one display in the preferred embodiment. Usually, only one such message will appear, corresponding to a fault noted on the display of FIG. 16.

FIG. 20 shows the display related to faults occurring from monitoring of the rotary limit switching transducer TDR. There is a separate output channel from the transducer for each lane of tooling, in the described apparatus there are twenty four such channels. The outputs from transducer TDR define a time interval during a press stroke (e.g. a "window") during which a preform must transfer from the first station to the second station of each tooling lane. The text at the top of FIG. 20 explains the nature and purpose of fault indications at this screen.

FIG. 21 shows the help screen display for hydraulic motor faults, derived from three different thermal monitors which indicate abnormal conditions in the hydraulic motor drive. One or more of these messages will appear on this screen depending on the overload conditions observed by the monitors.

FIG. 22 shows the help screen display for various monitors incorporated in clutch controller CC. One or more of these fault messages will appear, according to the outputs from the clutch control.

Figure 23:
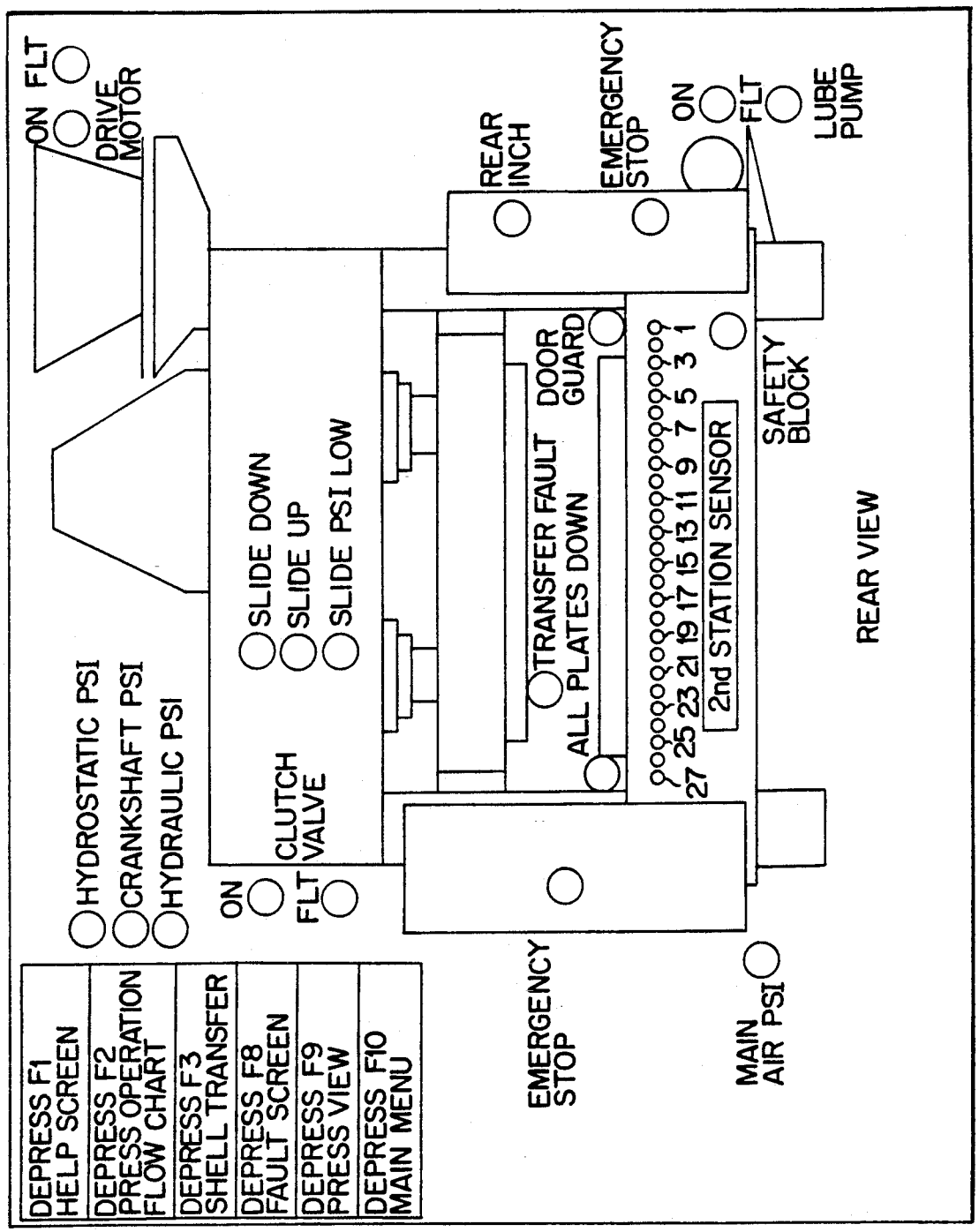

FIG. 23 is a depiction of a graphic display, showing a rear view of the press. On-off indications are shown in circles which are white if the monitored device is not powered, and green if it is active (under power); adjacent fault indicators (FLT) circles are illuminated green if no fault exists, and change to red if a fault is indicated.

FIG. 24 is the rear view help screen, related to FIG. 23. Again, one or more of the messages may appear when this screen is invoked, depending upon what fault is indicated on the press rear view display, FIG. 23.

Figure 25:
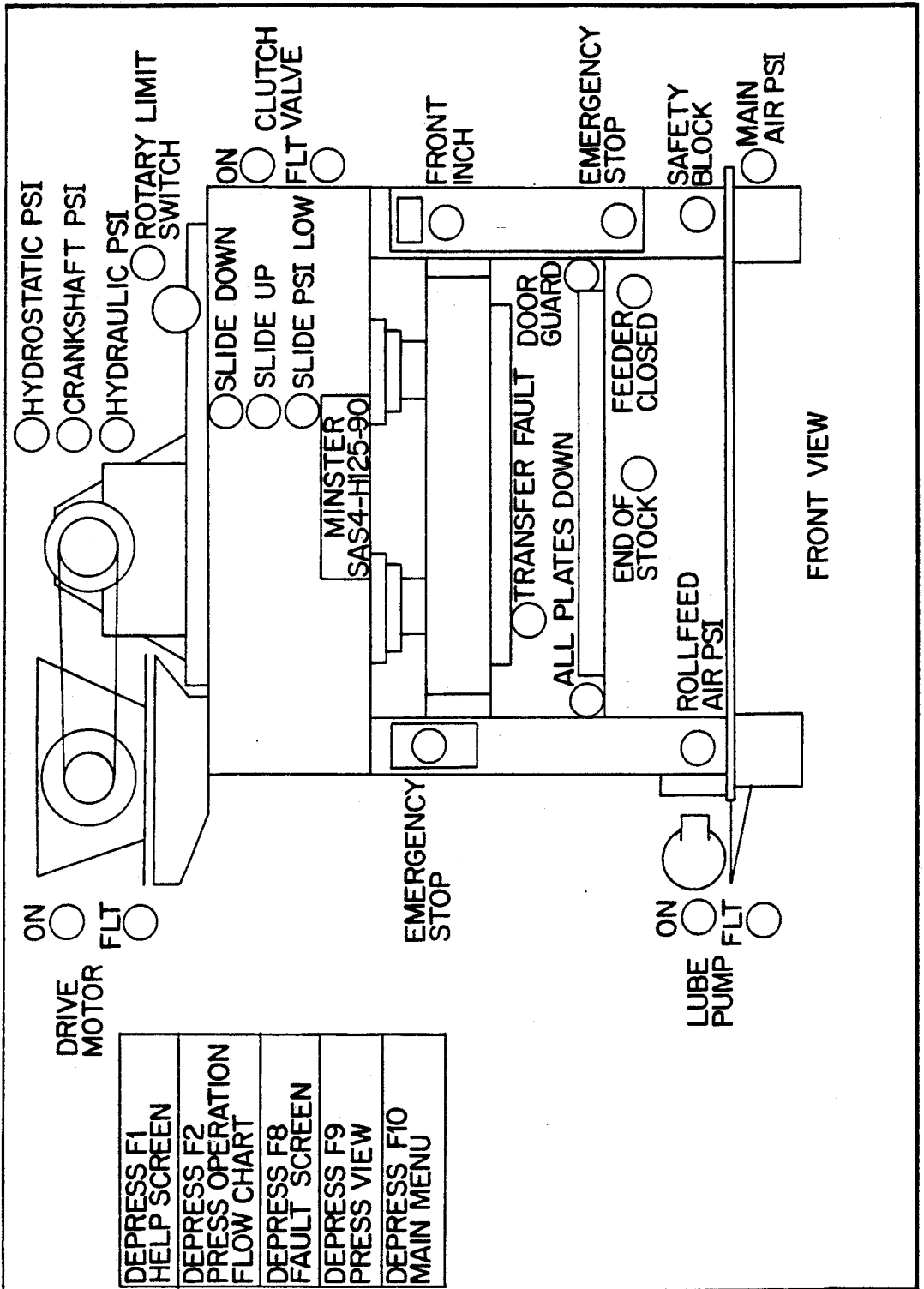
Figure 27:
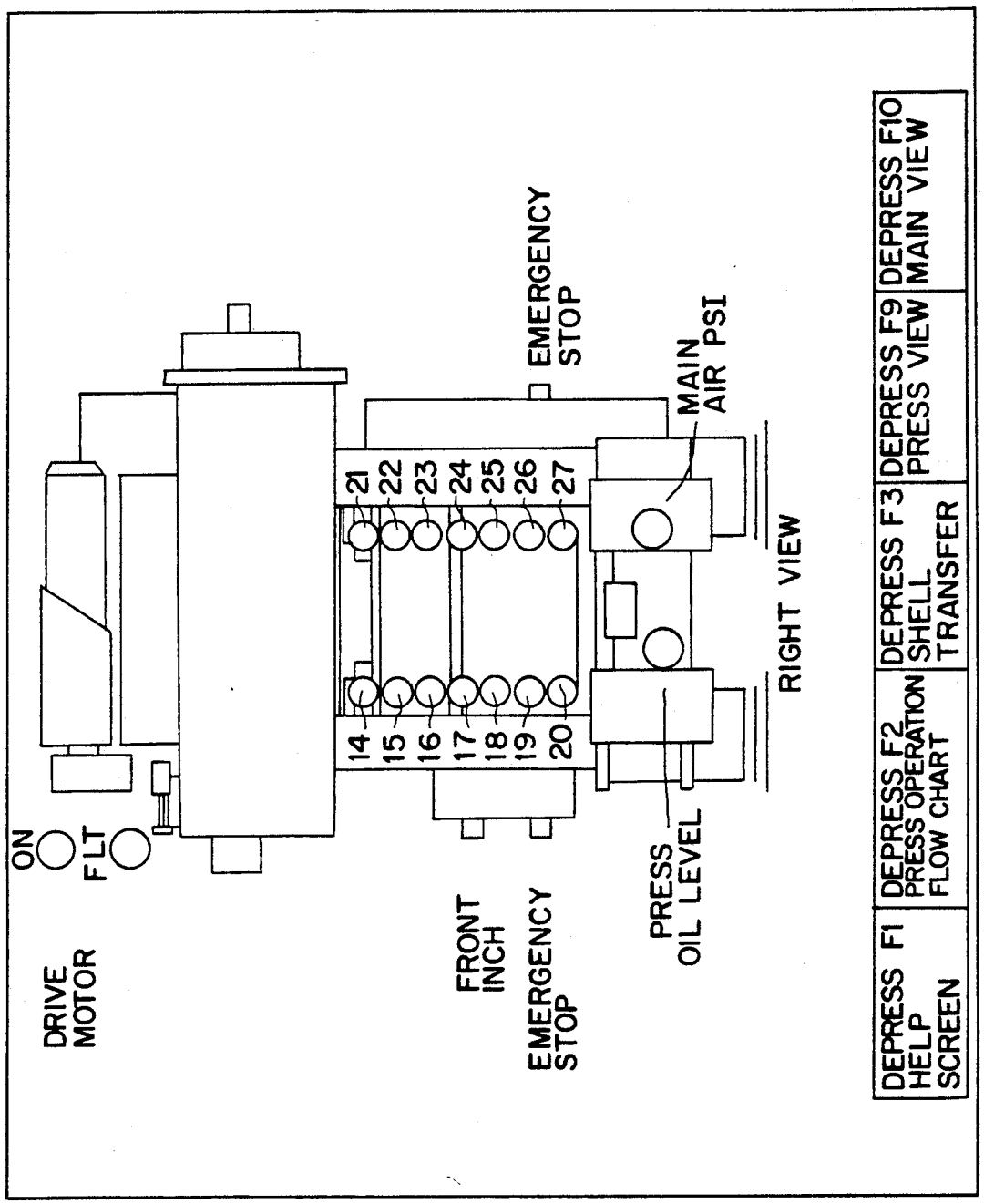
Figure 28:
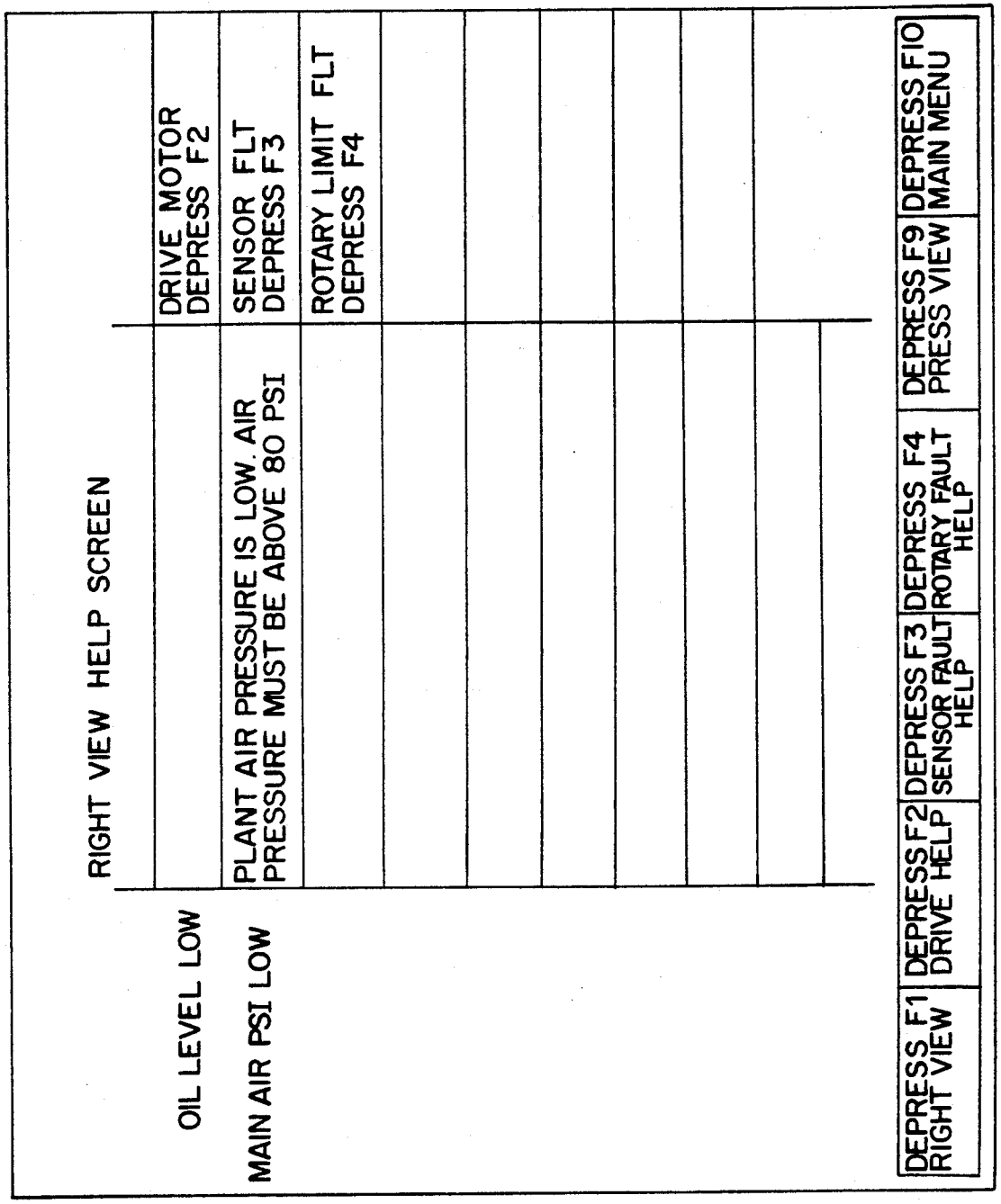
Figure 29:
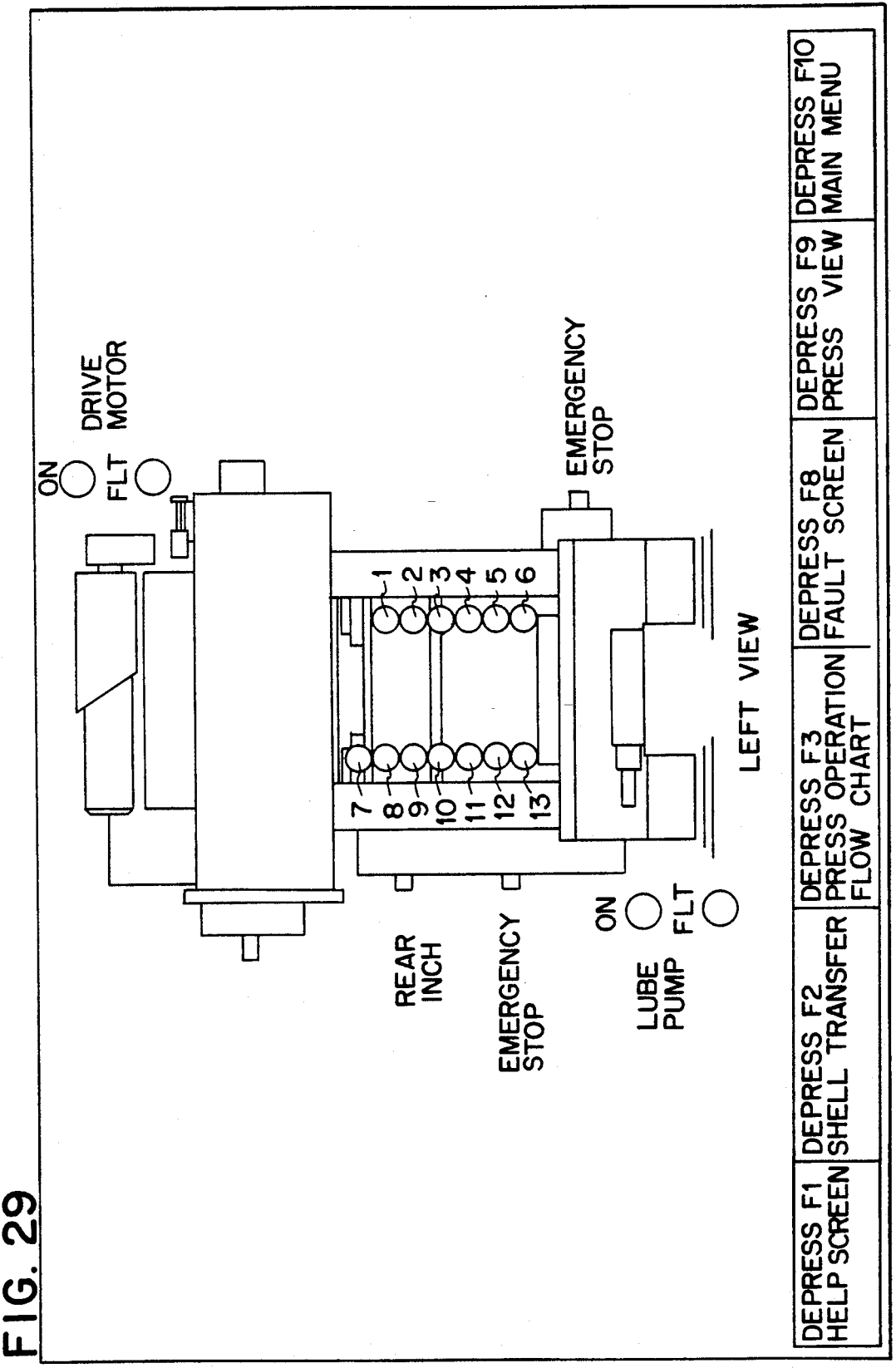
Figure 30:
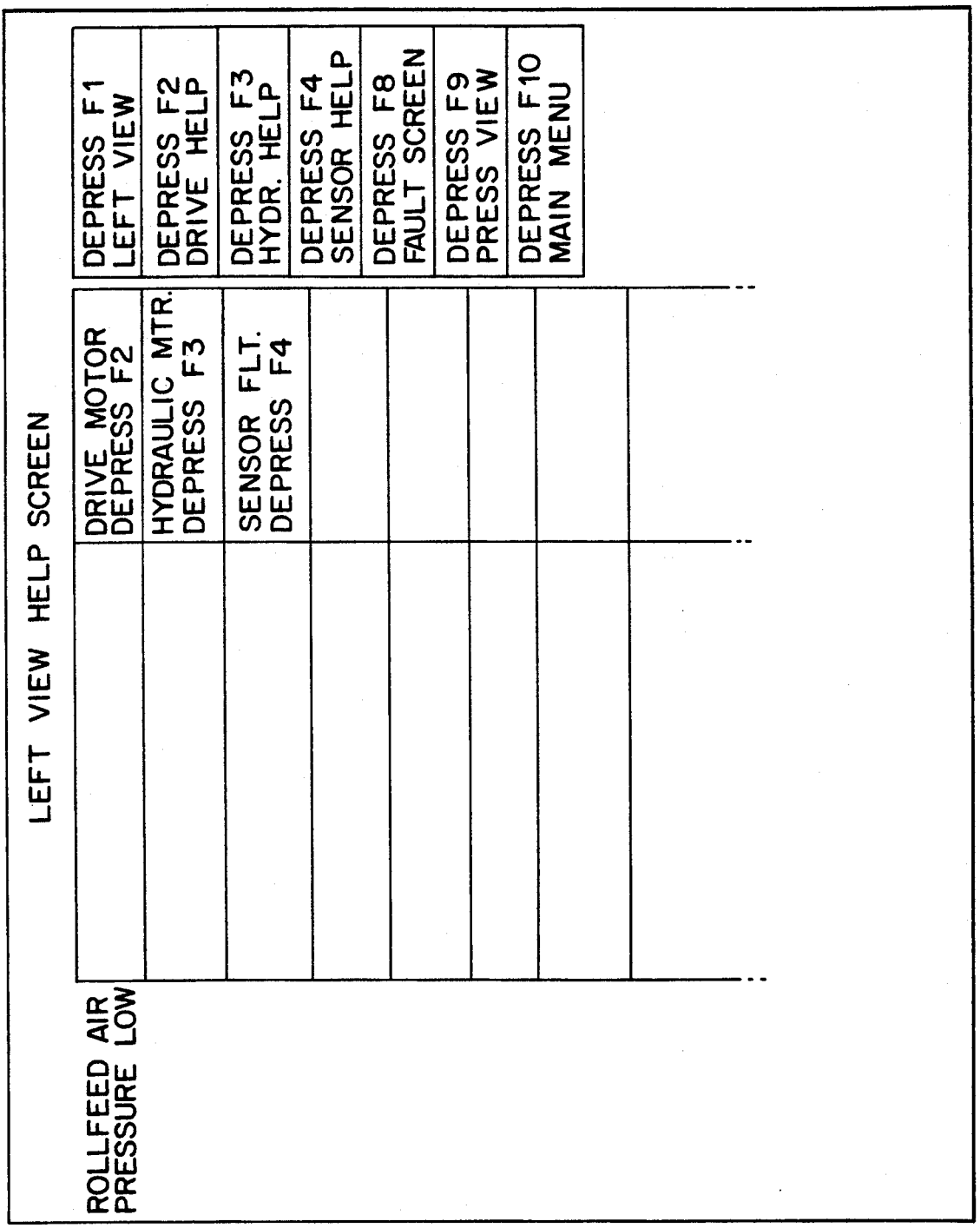

FIG. 25 is the graphic display of the press front view, and FIG. 26 is its associated help screen. FIG. 27 is the right side press view display, and FIG. 28 shows its help screen display. Similarly, FIG. 29 shows the press left view graphic display, and FIG. 30 illustrates its help screen.

FIG. 31 is another flow diagram display, these relating to the raising and lowering of the upper and lower transfer plates, UP and LP, and the stock support plate SP. The purpose of these displays is to assure that all conditions are met before actuating the hydraulic cylinders which raise and lower these plates, as described above in connection with FIGS. 8–10.

FIG. 32 is a graphic display which shows at the lower part of the screen the relative locations of the three plates, between operating and various maintenance positions. FIG. 33 is a help screen display related to the displays of FIGS. 31 and 32; again, one or more of the messages may appear depending upon a condition sensed by the control system.

FIG. 34 illustrates the flow chart for raising and lowering slide RM as part of the function of moving one or more of the plates UP, LP and SP. Again, if all blocks of the diagram are green background, the slide can be raised or lowered, and if any block has a red background, then an associated fault has been detected.

FIG. 35 shows the transfer monitor screen, which indicates whether the sensor units SEN-1 and/or SEN-2 are functioning properly. For example, as these are optical devices, their optical parts may require cleaning. If a predetermined minimum output does not exist from each sensor, the corresponding circle area on this display will be red, and if the minimum output signal s available, the circle will be green.

FIG. 36 illustrates the display of fault indications from the sets of sensors SEN-1 and/or SEN-2. If they sense a transfer malfunction, the corresponding circle area is turned red. This display gives the operator a complete comparative view of all transfer sensor status, by seeking one or more red circles. If all circles show green, then no transfer fault exists. FIGS. 37, 38 and 39 are all help screen displays for the displays of FIGS. 35 and 36. Various ones of the help messages may appear, depending upon the fault or malfunction conditions in the conveying of preforms from first to second tooling stations, or from the second station to exit the press.

FIG. 40 shows the status of the timers which monitor the passage of preforms and shell to/from the tooling stations. This display can be accessed, for example, by function key F2 in either the transfer monitor (FIG. 35) or shell transfer plan (FIG. 36) displays. It gives the operator an overview of the relative transfer timing in the various lanes of tooling, and can indicate incipient faults, as by an increase in transfer time for one or more lanes with respect to the remaining lanes.

FIG. 41 is an active fault display. On its display area (shown blank) will appear identification of all faults which are active at the time this display is invoked. If the press is stopped, these faults remain for observation until this screen is cleared by manual reset.

FIG. 42 is a further fault display which is a visual output of a fault history buffer. Fault occurrences are stored in a buffer, along with corresponding date and time of fault occurrence, up to a predetermined number of faults. For example, the last one hundred faults may be recorded in this buffer, after which the oldest will give way to the newest. The contents of this fault history can be called to this display and scrolled.

In addition, by driving a printer from the input of the fault buffer, or by storing this information in memory, such as a hard disc drive of suitable capacity, it is possible to record the entire fault history of the system over long periods of operation. Review of such information is useful to assist in analysis of press and component operation and maintenance history, such as to predict possible changes in maintenance schedules, and to identify chronically troublesome components which might be replaced to enhance overall system efficiency.

While the methods herein described, and the form of apparatus for carrying these method into effect, constitute preferred embodiments of this invention, it is to be understood that the invention is not limited to these precise methods and form of apparatus, and that changes may be made in either without departing from the scope of the invention, which is defined in the appended claims.

What is claimed is:

1. In a press for performing operations on can ends, said press having a bed and a slide, drive means connected to said slide to reciprocate said slide toward and away from said bed, upper and lower tooling supported on said slide and said bed, respectively, defining multiple progressive stations for performing successive operations on the parts conveyed through said press between said tooling, conveyor means positioned to advance the parts along multiple generally parallel lanes through said stations and to a discharge location at which the parts exit said press, said conveyor means being coordinated with said drive means whereby said conveyor means will function intermittently to convey parts between said stations while said tooling is opened, said drive means and said conveyor means being subject to a plurality of fault and failure conditions which can inhibit continued operation of said press;

the improvement comprising a control system for monitoring press operation and providing graphic feedback control information indicative of the type and location of fault and malfunction conditions which have or will interfere with continued press operation, said control system including a position transducer providing a succession of signals correlated to cyclic movement of said tooling from full open to full closed and back to full open, means indicating the status of said drive means, a programmable controller receiving inputs from said position transducer and said drive indicating means and providing control outputs to said drive means, a monitor system including a terminal for displaying a selection of displays uniquely related to the press and tooling operation, means electronically storing a plurality of such displays, selector mans for selecting particular displays as related to the inputs and outputs of said programmable controller, and indicator means in said displays to identify visually on the display a fault condition in the press or tooling requiring operator attention.

2. A system as defined in claim 1, wherein said displays include means for recreating drawing views of said press and said tooling at said terminal.

3. A system as defined in claim 2, wherein said displays include drawing views having elements interactively linked to said controller for indicating operational status of the press and tooling.

4. A system as defined in claim 3, wherein said elements of said displays indicate positional information of said slide.

5. A system as defined in claim 4, wherein said elements of said displays indicate positioning of said slide for maintenance operations on said tooling.

6. A system as defined in claim 3, wherein said elements of said displays indicate incipient press malfunctions due to improper power to or lubrication of the press parts.

7. A system as defined in claim 3, wherein said elements of said displays indicate status of said conveyor means.

8. A system as defined in claim 7, wherein said elements of said displays indicate timing functions of said conveyor means.

9. A system as defined in claim 8, wherein said elements of said displays indicate delays in portions of said conveyor means to predict potential obstructions.

10. A system as defined in claim 7, wherein one of said displays includes individual timers for each of the lanes of said conveyor means to show comparative timing information for the lanes.

11. A system as defined in claim 7, wherein said elements of said displays indicate malfunction in one or more parts of said conveyor means to anticipate a jam of parts therein.

12. A system as defined in claim 1, wherein said displays include operational flow diagrams of press operation and said diagrams have elements interactively linked to said drive means to indicate readiness status of the system.

13. A system as defined in claim 12, wherein said elements indicate potential malfunction of the press.

14. A system as defined in claim 12, wherein said drive means includes a means for moving said slide to a maintenance position outside its normal operating motion, said tooling including guide plates therein and means for selectively attaching at least some of said guide plates to said slide for moving said plates into maintenance positions, said displays including representations of the positions of said plates in a maintenence function.

15. A system as defined in claim 1, wherein said displays include text messages for assisting an operator in analyzing the depictions of the displays, and means for switching the exhibited displays to assist interpretation of the displays.

16. A system as defined in claim 1, wherein said displays include register means for storing a history of indicated faults from certain ones of the displays.

17. A system as defined in claim 1, wherein said displays include register means for retaining and cumulatively displaying a predetermined number of active faults detected by the system.

18. In a press for performing operations on parts for can ends, said press having a bed, a slide, a press drive means for reciprocating said slide toward and away from said bed, a set of cooperating progressive tooling supported on said slide and said bed, respectively, to close and open in performing a succession of operations on can end parts conveyed through said press, conveyor means positioned to move parts through said tooling, and means for driving said conveyor means in intermittent steps synchronized with said drive means whereby said conveyor means moves the parts progressively through said tooling:

the improvement comprising a programmable controller connected to govern the starting, stopping and running of the press and having outputs to the press drive means and the driving means of said conveyor means, means for monitoring the press drive means and the means for driving said conveyor means of the press, means for monitoring the progression of parts through the tooling, said monitoring means providing control inputs to said controller;

a monitor system including storage means for storing information to reproduce a plurality of display screens uniquely related to the press, tooling, and conveyor means configuration and operation, a terminal receiving information from said storage means for displaying selected ones of the display screens, selector means for selecting particular displays according to predetermined signals or combinations of signals related to the inputs and outputs of said programmable controller, and indicator means incorporated into said display screens and activated by associated ones of said transducers to identify visually on a selected display screen a fault or malfunction requiring operator attention or intervention.

19. In a press for performing operations on can ends, said press having a bed and a slide, drive means connected to said slide to reciprocate said slide toward and away from said bed, upper and lower tooling supported on said slide and said bed, respectively, defining multiple progressive stations for performing successive operations on the parts conveyed through said press between said tooling, conveyor means positioned to advance the parts through said stations and to a discharge location at which the parts exit said press, said conveyor means being coordinated with said drive means whereby said conveyor means will function intermittently to convey parts between said stations while said tooling is opened;

the improvement comprising a control system for monitoring press operation and providing graphic feedback control information indicative of the type and location of fault or malfunction conditions which have or will interfere with continued press operation, said control system including a position transducer providing a succession of signals correlated to cyclic movement of said tooling from full open to full closed and back to full open, conveyor means transducers indicating the status of said conveyor means, drive means transducers indicating the status of said drive means, a programmable controller receiving inputs from said position transducer, said drive means transducers and said conveyor means transducers, and providing control outputs to said conveyor means and said drive means, a monitor system including a terminal for displaying a selection of displays uniquely related to the press, tooling, and conveyor means construction and operation, means storing a plurality of such displays as digital information which can recreate selected ones of the displays, selector means for selecting particular displays as related to the inputs and outputs of said programmable controller, and indicator means in said displays and activated by associated ones of said transducers to identify visually on the display a fault or malfunction requiring operator attention or intervention.

20. A system as defined in claim 19, wherein said displays include means for recreating drawing views of said press, said tooling and said conveyor means at said terminal.

21. A method of a press for performing operations on can ends, said press having a bed and a slide, drive means connected to said slide to reciprocate said slide toward and away from said bed, upper and lower tooling supported on said slide and said bed, respectively, defining multiple progressive stations for performing successive operations on the parts conveyed through said press between said tooling, conveyor means positioned to advance the parts through said stations and to a discharge location at which the parts exit said press, said conveyor means being coordinated with said drive means whereby said conveyor means will function intermittently to convey parts between said stations while said tooling is opened, and a programmable controller connected to monitor and control the system;

the steps of monitoring press operation and providing graphic feedback control information indicative of the type and location of fault or malfunction conditions which have or will interfere with continued press operation, providing a succession of signals correlated to cyclic movement of said tooling from full open to full closed and back to full open, creating and displaying electronic displays uniquely related to the press and tooling operation, electronically storing a plurality of such displays, selecting particular displays as related to the inputs and outputs of the programmable controller, and identifying visually on the displays fault conditions in the press or tooling requiring operator attention.

* * * * *